United States Patent
Cheng et al.

(10) Patent No.: US 11,251,910 B2
(45) Date of Patent: *Feb. 15, 2022

(54) METHOD, APPARATUS, UE, AND BASE STATION FOR TRANSMITTING HYBRID AUTOMATIC REPEAT REQUEST-ACKNOWLEDGEMENT INFORMATION

(71) Applicant: Huawei Technologies Co., Ltd., Shenzhen (CN)

(72) Inventors: Yan Cheng, Beijing (CN); Sha Ma, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

This patent is subject to a terminal disclaimer.

(21) Appl. No.: 16/856,925

(22) Filed: Apr. 23, 2020

(65) Prior Publication Data

US 2020/0252169 A1    Aug. 6, 2020

Related U.S. Application Data

(63) Continuation of application No. 14/686,295, filed on Apr. 14, 2015, now Pat. No. 10,644,843, which is a
(Continued)

(51) Int. Cl.
*H04B 7/00* (2006.01)
*H04L 1/18* (2006.01)
(Continued)

(52) U.S. Cl.
CPC .............. *H04L 1/1854* (2013.01); *H04L 1/16* (2013.01); *H04L 1/1861* (2013.01); *H04L 5/001* (2013.01);
(Continued)

(58) Field of Classification Search
CPC ....... H04L 1/1854; H04L 1/16; H04L 1/1861; H04L 5/001; H04L 5/0032; H04L 5/0055;
(Continued)

(56) References Cited

U.S. PATENT DOCUMENTS 8,934,350 B2 *  1/2015  Chen ..................... H04L 1/0026
                                                            370/241
9,172,519 B2   10/2015  Seo et al.
(Continued)

FOREIGN PATENT DOCUMENTS

CN     102064921 A    5/2011
CN     102084704 A    6/2011
(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 11)," 3GPP TS 36.212 V11.0.0, 79 pages (Sep. 2012).
(Continued)

*Primary Examiner* — Dmitry Levitan
(74) *Attorney, Agent, or Firm* — Leydig, Voit & Mayer, Ltd.

(57) ABSTRACT

A method, an apparatus, a UE, and a base station for transmitting a HARQ-ACK are disclosed. The method includes: determining a channel for transmitting a HARQ-ACK; determining a HARQ-ACK feedback bit; and sending the HARQ-ACK feedback bit on the channel. According to this application, transmission of a HARQ-ACK between a UE and a base station can be implemented in a scenario where carrier aggregation is performed between base stations having a non-ideal backhaul.

12 Claims, 7 Drawing Sheets

Related U.S. Application Data continuation of application No. PCT/CN2012/083013, filed on Oct. 16, 2012.

(51) Int. Cl.
*H04L 5/00* (2006.01)
*H04L 1/16* (2006.01)
*H04L 5/14* (2006.01)

(52) U.S. Cl.
CPC .......... *H04L 5/0032* (2013.01); *H04L 5/0055* (2013.01); *H04L 5/14* (2013.01); *H04L 5/0035* (2013.01)

(58) Field of Classification Search
CPC ........ H04L 5/14; H04L 5/0035; H04W 16/02; H04W 24/02; H04W 72/0413; H04W 72/0446
USPC .......................................... 370/310, 328, 329
See application file for complete search history.

(56) References Cited

U.S. PATENT DOCUMENTS

| | | | |
|---|---|---|---|
| 9,203,587 | B2* | 12/2015 | Guan ................ H04W 72/0413 |
| 9,363,687 | B2 | 6/2016 | Seo et al. |
| 9,419,776 | B2* | 8/2016 | Gauvreau ................. H04L 5/14 |
| 9,515,696 | B2* | 12/2016 | Lee ........................... H04L 5/16 |
| 9,553,697 | B2 | 1/2017 | Chen et al. |
| 9,572,138 | B2 | 2/2017 | Lee et al. |
| 9,730,198 | B2 | 8/2017 | Lee et al. |
| 2009/0245212 | A1 | 10/2009 | Sambhwani et al. |
| 2010/0195629 | A1 | 8/2010 | Chen et al. |
| 2012/0082145 | A1 | 4/2012 | Chen et al. |
| 2012/0087254 | A1 | 4/2012 | Yin et al. |
| 2012/0106408 | A1 | 5/2012 | Papasakellariou et al. |
| 2012/0155337 | A1 | 6/2012 | Park |
| 2012/0230218 | A1 | 9/2012 | Mauritz et al. |
| 2012/0257552 | A1 | 10/2012 | Chen et al. |
| 2013/0039231 | A1 | 2/2013 | Wang |
| 2013/0077542 | A1 | 3/2013 | Yang et al. |
| 2013/0195065 | A1 | 8/2013 | Park |
| 2013/0322343 | A1 | 12/2013 | Seo et al. |
| 2014/0003303 | A1 | 1/2014 | Yang et al. |
| 2014/0003381 | A1 | 1/2014 | Lee et al. |
| 2014/0153449 | A1 | 6/2014 | Seo et al. |
| 2014/0161002 | A1 | 6/2014 | Gauvreau et al. |
| 2014/0219217 | A1 | 8/2014 | Montojo et al. |
| 2014/0334395 | A1 | 11/2014 | Lee et al. |
| 2015/0085714 | A1 | 3/2015 | Liang et al. |

FOREIGN PATENT DOCUMENTS

| | | |
|---|---|---|
| CN | 102098151 A | 6/2011 |
| CN | 102104469 A | 6/2011 |
| CN | 102136894 A | 7/2011 |
| CN | 102142941 A | 8/2011 |
| EP | 2451111 A2 | 5/2012 |
| EP | 2903196 B1 | 12/2017 |
| RU | 2452106 C1 | 5/2012 |
| WO | 2010091289 A2 | 8/2010 |
| WO | 2010124238 A2 | 10/2010 |
| WO | 2011062547 A1 | 5/2011 |
| WO | 2011127100 A1 | 10/2011 |
| WO | 2012050389 A1 | 4/2012 |
| WO | 2012060649 A2 | 5/2012 |
| WO | 2012088877 A1 | 7/2012 |
| WO | 2012108720 A2 | 8/2012 |
| WO | 2012109195 A2 | 8/2012 |

OTHER PUBLICATIONS

"3rd Generation Partnership Project; Technical Specification Group Radio Access Network; Evolved Universal Terrestrial Radio Access (E-UTRA); Physical layer procedures (Release 11)," 3GPP TS 36.213 V11.0.0, 143 pages. (Sep. 2012).

* cited by examiner

METHOD, APPARATUS, UE, AND BASE STATION FOR TRANSMITTING HYBRID AUTOMATIC REPEAT REQUEST-ACKNOWLEDGEMENT INFORMATION

CROSS REFERENCE TO RELATED APPLICATIONS

This application is a continuation of U.S. application Ser. No. 14/686,295, filed on Apr. 14, 2015, which is a continuation of International Application No. PCT/CN2012/083013, filed on Oct. 16, 2012. All of the afore-mentioned patent applications are hereby incorporated by reference in their entireties.

TECHNICAL FIELD

The present disclosure relates to the communications field, and in particular, to a method, an apparatus, a user equipment (UE), and a base station (e.g., eNB, Evolved NodeB) for transmitting a hybrid automatic repeat request-acknowledgement (HARQ-ACK).

BACKGROUND

Long term evolution-advanced (LTE-A) is a system further evolved and enhanced from a 3GPP LTE system. In the LTE-A system, a carrier aggregation (CA) technology is introduced to satisfy the requirement of the International Telecommunication Union for the peak data rate of the fourth generation communications technology. The carrier aggregation technology is also referred to as a spectrum aggregation technology or a bandwidth extension technology.

In carrier aggregation, spectrums of two or more component carriers are aggregated to form an aggregated carrier to obtain a wider transmission bandwidth. Spectrums of component carriers in the aggregated carrier may be contiguous continuous spectrums, or may be non-contiguous spectrums in a same frequency band or even discontinuous spectrums in different frequency bands. For the aggregated carrier, an LTE Rel-8/9 user equipment (UE) can access only one of component carriers to transmit and receive data, but an LTE-A UE can access multiple component carriers simultaneously according to its own capability and service requirement to transmit and receive data.

In the carrier aggregation, to support technologies such as dynamic scheduling, downlink multiple input multiple output (MIMO) transmission, and hybrid automatic repeat request, the UE needs to fed back multiple types of uplink control information (UCI) to a base station through a physical uplink control channel (PUCCH), where the UCI includes channel state information (CSI), a HARQ-ACK, a scheduling request (SR), and so on, where the HARQ-ACK may also be simply referred to as an ACK (acknowledgement)/NACK (negative acknowledgement) and the SR is used by the UE to request resources for uplink data sending from the base station.

In the prior art, during carrier aggregation, carriers in a macro base station and a micro base station that have an ideal backhaul may be aggregated. For example, if the macro base station and micro base station are connected through optical fibers, where the micro base station is implemented by using a radio head and an ideal backhaul exists between the macro base station and the micro base station, data may be transmitted between the macro base station and the micro base station in real time. Multiple carries in the macro base station and micro base station may be scheduled jointly, that is, the macro base station also knows the scheduling condition on another component carrier when scheduling one component carrier in the aggregated carrier. In this case, when the UE feeds back a HARQ-ACK to the micro base station, generally the UE sends the HARQ-ACK to the macro base station through a PUCCH on an uplink primary carrier corresponding to the macro base station, and then the macro base station forwards the HARQ-ACK to the micro base station. Because an ideal backhaul exists between the macro base station and the micro base station, both the macro base station and the micro base station can obtain in real time the HARQ-ACK fed back by the UE.

With the continuous development of technologies, carrier aggregation between base stations having a non-ideal backhaul will be introduced in the LTE-A system, where the base stations having a non-ideal backhaul may be two macro base stations, or a macro base station and a micro base station, or two micro base stations, and so on. At present, the prior art has not disclosed a method for transmitting a HARQ-ACK between a UE and a base station in a case where carrier aggregation is performed between base stations having a non-ideal backhaul.

SUMMARY

Embodiments of the present disclosure provide a method, an apparatus, a UE, and a base station for transmitting a HARQ-ACK, which can implement transmission of a HARQ-ACK between a UE and a base station in a scenario where carrier aggregation is performed between base stations having a non-ideal backhaul.

To solve the technical problem above, the embodiments of the present disclosure disclose the following technical solutions:

According to a first aspect, a method for transmitting hybrid automatic repeat request-acknowledgement information HARQ-ACK is provided, including:

determining a channel for transmitting a HARQ-ACK;
determining a HARQ-ACK feedback bit; and
transmitting the HARQ-ACK feedback bit on the channel.

With reference to the first aspect, in a first possible implementation manner, the determining a channel for transmitting a HARQ-ACK includes:

when a UE is configured to support simultaneous transmission of a PUSCH and a PUCCH, determining that the channel for transmitting the HARQ-ACK is a PUCCH;

when the UE is not configured to support simultaneous transmission of a PUSCH and a PUCCH, and no PUSCH is transmitted in a current subframe, determining that the channel for transmitting the HARQ-ACK is a PUCCH; and/or when the UE is not configured to support simultaneous transmission of a PUSCH and a PUCCH, and a PUSCH is transmitted in the current subframe, determining, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK;

where the current subframe is a subframe for transmitting the HARQ-ACK.

With reference to the first aspect and/or the first possible implementation manner, in a second possible implementation manner, the base stations include a first base station and a second base station;

the determining, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK includes:

when the UE only detects that a PDSCH and/or a PDCCH indicating semi-persistent scheduling release is transmitted in a downlink carrier corresponding to the first base station, and a PUSCH is transmitted in an uplink carrier corresponding to the first base station in the current subframe, determining that the channel for transmitting the HARQ-ACK is the PUSCH transmitted in the uplink carrier corresponding to the first base station;

when the UE only detects that a PDSCH and/or a PDCCH indicating semi-persistent scheduling release is transmitted in a downlink carrier corresponding to the second base station, and a PUSCH is transmitted in an uplink carrier corresponding to the second base station in the current subframe, determining that the channel for transmitting the HARQ-ACK is the PUSCH transmitted in the uplink carrier corresponding to the second base station;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and PUSCHs are transmitted in uplink carriers corresponding to both the first base station and the second base station in the current subframe, determining, according to a first preset manner, the channel for transmitting the HARQ-ACK;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and a PUSCH is transmitted in an uplink carrier corresponding to only the first base station or the second base station in the current subframe, determining, according to a second preset manner, the channel for transmitting the HARQ-ACK;

when the UE only detects that a PDSCH and/or a PDCCH indicating semi-persistent scheduling release is transmitted in a downlink carrier corresponding to the first base station, and a PUSCH is transmitted in an uplink carrier corresponding to only the second base station in the current subframe, determining that the channel for transmitting the HARQ-ACK is a PUCCH; or when the UE only detects that a PDSCH and/or a PDCCH indicating semi-persistent scheduling release is transmitted in a downlink carrier corresponding to the second base station, and a PUSCH is transmitted in an uplink carrier corresponding to only the first base station in the current subframe, determining that the channel for transmitting the HARQ-ACK is a PUCCH.

With reference to the first aspect, and/or the first possible implementation manner, and/or the second possible implementation manner, in a third possible implementation manner, the determining, according to a first preset manner, the channel for transmitting the HARQ-ACK includes:

determining that the channel for transmitting the HARQ-ACK is a PUSCH transmitted in an uplink carrier corresponding to the first base station; or determining that the channel for transmitting the HARQ-ACK is a PUSCH transmitted in an uplink carrier corresponding to the second base station; or determining that the channel for transmitting the HARQ-ACK is a PUCCH; or determining that the channel for transmitting the HARQ-ACK is a PUSCH transmitted in an uplink carrier corresponding to the first base station and a PUSCH transmitted in an uplink carrier corresponding to the second base station; or determining, according to a preset priority condition, the channel for transmitting the HARQ-ACK.

With reference to the first aspect, and/or the first possible implementation manner, and/or the second possible implementation manner, and/or the third possible implementation manner, in a fourth possible implementation manner, the preset priority condition is a HARQ-ACK transmission priority of each base station; and therefore, the determining, according to a preset priority condition, the channel for transmitting the HARQ-ACK includes:

determining, according to the HARQ-ACK transmission priority of each base station, that the channel for transmitting the HARQ-ACK is a PUSCH transmitted in an uplink carrier corresponding to a base station of a higher transmission priority;

or, the preset priority condition is a priority of a PUSCH transmitted in a carrier corresponding to each base station; and therefore, the determining, according to a preset priority condition, the channel for transmitting the HARQ-ACK includes:

determining, according to the priorities of PUSCHs, that the channel for transmitting the HARQ-ACK is a PUSCH of a higher priority.

With reference to the first aspect, and/or the first possible implementation manner, and/or the second possible implementation manner, and/or the third possible implementation manner, and/or the fourth possible implementation manner, in a fifth possible implementation manner, the determining, according to a second preset manner, the channel for transmitting the HARQ-ACK includes:

when a PUSCH is transmitted in an uplink carrier corresponding to only the first base station in the current subframe, determining that the channel for transmitting the HARQ-ACK is the PUSCH transmitted in the uplink carrier corresponding to the first base station;

when a PUSCH is transmitted in an uplink carrier corresponding to only the second base station in the current subframe, determining that the channel for transmitting the HARQ-ACK is the PUSCH transmitted in the uplink carrier corresponding to the second base station; or determining that the channel for transmitting the HARQ-ACK is a PUCCH.

With reference to the first aspect, and/or the first possible implementation manner, and/or the second possible implementation manner, and/or the third possible implementation manner, and/or the fourth possible implementation manner, and/or the fifth possible implementation manner, in a sixth possible implementation manner, the first base station is a macro base station, and the second base station is a micro base station.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the determining a HARQ-ACK feedback bit includes:

determining, according to HARQ-ACK timing of each carrier, the number of downlink subframes corresponding to the current subframe for each carrier; and determining the HARQ-ACK feedback bit based on the number of downlink subframes corresponding to the current subframe for each carrier, where, the HARQ-ACK timing of each carrier includes: when at least one carrier uses an FDD manner and at least one carrier uses a TDD manner in carriers for carrier aggregation for the user equipment, if detecting, in subframe n, a PDSCH or a PDCCH indicating semi-persistent scheduling release in the carrier that uses the TDD manner, the UE shall determine to feed back a HARQ-ACK corresponding to the PDSCH or the PDCCH in subframe n+4.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the determining the HARQ-ACK feedback bit based on the number of downlink subframes corresponding to the current subframe for each carrier includes:

when determining that the channel for transmitting the HARQ-ACK is a PUCCH, determining the HARQ-ACK feedback bit based on the number of carriers configured for the UE, a transmission mode of each carrier, and the number of downlink subframes corresponding to the current subframe for each carrier; and/or when determining that the channel for transmitting the HARQ-ACK is a PUSCH, determining the HARQ-ACK feedback bit based on a first configured carrier set, a transmission mode of each carrier in the first configured carrier set, and the number of downlink subframes corresponding to the current subframe for each carrier, where the first configured carrier set includes all downlink carriers corresponding to the PUSCH in downlink carriers configured for the UE, where the downlink carriers corresponding to the PUSCH are downlink carriers corresponding to a base station corresponding to the PUSCH.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, when determining that the channel for transmitting the HARQ-ACK is a PUCCH, sending the HARQ-ACK feedback bit on the channel includes:

determining a PUCCH resource for transmitting the HARQ-ACK; and sending the HARQ-ACK feedback bit by using the PUCCH resource.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, when a channel format of the PUCCH is format 3, and when the current subframe is configured to transmit a scheduling request, the determining a PUCCH resource for transmitting the HARQ-ACK includes:

reserving a PUCCH resource for each base station; and determining, according to a base station corresponding to the scheduling request that the current subframe is configured to transmit, the PUCCH resource reserved for the base station as the PUCCH resource for transmitting the HARQ-ACK; or reserving a PUCCH resource; determining a PUCCH resource index, and obtaining a sequence index of an orthogonal sequence of the PUCCH according to the resource index; determining, according to a base station corresponding to the scheduling request that the current subframe is configured to transmit, a cyclic shift of a sequence index preset for the base station as a cyclic shift of a reference signal; and determining the reserved PUCCH resource that uses the cyclic shift of the reference signal, as the PUCCH resource for transmitting the HARQ-ACK.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, when a channel format of the PUCCH is format 1b, and when the current subframe is configured to transmit a scheduling request, the determining a PUCCH resource for transmitting the HARQ-ACK includes:

reserving a PUCCH resource for each base station; and determining, according to a base station corresponding to the scheduling request that the current subframe is configured to transmit, the PUCCH resource reserved for the base station as the PUCCH resource for transmitting the HARQ-ACK.

According to a second aspect, a method for transmitting a HARQ-ACK is provided, including:

determining a channel used by a UE for transmitting a HARQ-ACK;

determining the number of bits of the HARQ-ACK transmitted by the UE; and detecting the HARQ-ACK on the channel according to the number of bits.

With reference to the second aspect, in a first possible implementation manner, the determining a channel used by a UE for transmitting a HARQ-ACK includes:

when the UE is configured to support simultaneous transmission of a PUSCH and a PUCCH, determining that the channel used by the UE for transmitting the HARQ-ACK is a PUCCH;

when the UE is not configured to support simultaneous transmission of a PUSCH and a PUCCH, and no PUSCH is transmitted in a current subframe, determining that the channel used by the UE for transmitting the HARQ-ACK is a PUCCH; and/or when the UE is not configured to support simultaneous transmission of a PUSCH and a PUCCH, and a PUSCH is transmitted in the current subframe, determining that the channel used by the UE for transmitting the HARQ-ACK is a PUCCH and PUSCH, and that the PUCCH has a higher priority than the PUSCH, where the current subframe is a subframe for transmitting the HARQ-ACK.

With reference to the second aspect, and/or the first possible implementation manner, in a second possible implementation manner, the determining the number of bits of the HARQ-ACK transmitted by the UE includes:

determining, according to HARQ-ACK timing of each carrier, the number of downlink subframes corresponding to the current subframe for each carrier; and determining the number of bits of the HARQ-ACK based on the number of downlink subframes corresponding to the current subframe for each carrier, where, the HARQ-ACK timing of each carrier includes:
when at least one carrier uses an FDD manner and at least one carrier uses a TDD manner in carriers for carrier aggregation for the user equipment, if detecting, in subframe n, a PDSCH or a PDCCH indicating semi-persistent scheduling release in the carrier that uses the TDD manner, the UE shall determine to feed back a HARQ-ACK corresponding to the PDSCH or the PDCCH in subframe n+4.

With reference to the second aspect, and/or the first possible implementation manner, and/or the second possible implementation manner, in a third possible implementation manner, the determining the number of bits of the HARQ-ACK based on the number of downlink subframes corresponding to the current subframe for each carrier includes:

when determining that the channel used by the UE for transmitting the HARQ-ACK is a PUCCH, determining the number of bits of the HARQ-ACK based on the number of carriers configured for the UE, a transmission mode of each carrier, and the number of downlink subframes corresponding to the current subframe for each carrier; and when determining that the channel used by the UE for transmitting the HARQ-ACK is a PUSCH, determining the number of bits of the HARQ-ACK based on a second configured carrier set, a transmission mode of each carrier in the second configured carrier set, and the number of downlink subframes corresponding to the current subframe for each carrier, where the second configured carrier set includes all downlink carriers configured by the base station for the UE.

With reference to the second aspect, and/or the first possible implementation manner, and/or the second possible implementation manner, and/or the third possible implementation manner, in a fourth possible implementation manner, when determining that the channel used by the UE for transmitting the HARQ-ACK is a PUCCH, detecting the HARQ-ACK on the channel includes:

determining a PUCCH resource used by the UE for transmitting the HARQ-ACK; and detecting the HARQ-ACK on the PUCCH resource according to the number of bits.

With reference to the second aspect, and/or the first possible implementation manner, and/or the second possible implementation manner, and/or the third possible implementation manner, and/or the fourth possible implementation manner, in a fifth possible implementation manner, the method further includes:

detecting scheduling request information on the PUCCH resource, and determining, according to the determined PUCCH resource, a base station corresponding to the scheduling request information request, where the base station corresponding to the scheduling request is a base station from which an uplink resource is requested by the scheduling request.

With reference to the second aspect, and/or the first possible implementation manner, and/or the second possible implementation manner, and/or the third possible implementation manner, and/or the fourth possible implementation manner, and/or the fifth possible implementation manner, in a sixth possible implementation manner, the PUCCH resource is a resource semi-statically reserved by the base station for the user equipment, and the base station transmits information indicating the semi-statically reserved PUCCH resource to another base station through an X2 interface.

According to a third aspect, an apparatus for transmitting hybrid automatic repeat request-acknowledgement information HARQ-ACK is provided, including:

a first determining unit, configured to determine a channel for transmitting a HARQ-ACK;

a bit determining unit, configured to determine a HARQ-ACK feedback bit; and a sending unit, configured to send the HARQ-ACK feedback bit determined by the bit determining unit on the channel determined by the first determining unit.

With reference to the third aspect, in a first possible implementation manner, the first determining unit includes:

a first determining subunit, configured to: when a UE is configured to support simultaneous transmission of a PUSCH and a PUCCH, determine that the channel for transmitting the HARQ-ACK is a PUCCH;

a second determining subunit, configured to: when the UE is not configured to support simultaneous transmission of a PUSCH and a PUCCH, and no PUSCH is transmitted in a current subframe, determine that the channel for transmitting the HARQ-ACK is a PUCCH; and/or a third determining subunit, configured to: when the UE is not configured to support simultaneous transmission of a PUSCH and a PUCCH, and a PUSCH is transmitted in the current subframe, determine, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK, where the current subframe is a subframe for transmitting the HARQ-ACK.

With reference to the third aspect and/or the first possible implementation manner, in a second possible implementation manner, the base stations include a first base station and a second base station;

the third determining subunit is specifically configured to:
when the UE is not configured to support simultaneous transmission of a PUSCH and a PUCCH, and a PUSCH is transmitted in the current subframe,
when the UE only detects that a PDSCH and/or a PDCCH indicating semi-persistent scheduling release is transmitted in a downlink carrier corresponding to the first base station, and a PUSCH is transmitted in an uplink carrier corresponding to the first base station in the current subframe, determine that the channel for transmitting the HARQ-ACK is the PUSCH transmitted in the uplink carrier corresponding to the first base station;

when the UE only detects that a PDSCH and/or a PDCCH indicating semi-persistent scheduling release is transmitted in a downlink carrier corresponding to the second base station, and a PUSCH is transmitted in an uplink carrier corresponding to the second base station in the current subframe, determine that the channel for transmitting the HARQ-ACK is the PUSCH transmitted in the uplink carrier corresponding to the second base station;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and PUSCHs are transmitted in uplink carriers corresponding to both the first base station and the second base station in the current subframe, determine, according to a first preset manner, the channel for transmitting the HARQ-ACK;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and a PUSCH is transmitted in an uplink carrier corresponding to only the first base station or the second base station in the current subframe, determine, according to a second preset manner, the channel for transmitting the HARQ-ACK;

when the UE only detects that a PDSCH and/or a PDCCH indicating semi-persistent scheduling release is transmitted in a downlink carrier corresponding to the first base station, and a PUSCH is transmitted in an uplink carrier corresponding to only the second base station in the current subframe, determine that the channel for transmitting the HARQ-ACK is a PUCCH; or when the UE only detects that a PDSCH and/or a PDCCH indicating semi-persistent scheduling release is transmitted in a downlink carrier corresponding to the second base station, and a PUSCH is transmitted in an uplink carrier corresponding to only the first base station in the current subframe, determine that the channel for transmitting the HARQ-ACK is a PUCCH.

With reference to the third aspect, and/or the first possible implementation manner, and/or the second possible implementation manner, in a third possible implementation manner, the third determining subunit is specifically configured to implement, in the following manners, the determining, according to a first preset manner, the channel for transmitting the HARQ-ACK:

determining that the channel for transmitting the HARQ-ACK is a PUSCH transmitted in an uplink carrier corresponding to the first base station; or determining that the channel for transmitting the HARQ-ACK is a PUSCH transmitted in an uplink carrier corresponding to the second base station; or determining that the channel for transmitting the HARQ-ACK is a PUCCH; or determining that the channel for transmitting the HARQ-ACK is a PUSCH transmitted in an uplink carrier corresponding to the first base station and a PUSCH transmitted in an uplink carrier corresponding to the second base station; or determining, according to a preset priority condition, the channel for transmitting the HARQ-ACK.

With reference to the third aspect, and/or the first possible implementation manner, and/or the second possible implementation manner, and/or the third possible implementation manner, in a fourth possible implementation manner, the preset priority condition is a HARQ-ACK transmission priority of each base station; and therefore, the third determining subunit is specifically configured to implement, in the following manners, the determining, according to a preset priority condition, the channel for transmitting the HARQ-ACK:

determining, according to the HARQ-ACK transmission priority of each base station, that the channel for transmitting the HARQ-ACK is a PUSCH transmitted in an uplink carrier corresponding to a base station of a higher transmission priority;

or, the preset priority condition is a priority of a PUSCH transmitted in a carrier corresponding to each base station; and therefore, the determining, according to a preset priority condition, the channel for transmitting the HARQ-ACK includes:

determining, according to the priorities of PUSCHs, that the channel for transmitting the HARQ-ACK is a PUSCH of a higher priority.

With reference to the third aspect, and/or the first possible implementation manner, and/or the second possible implementation manner, and/or the third possible implementation manner, and/or the fourth possible implementation manner, in a fifth possible implementation manner, the third determining subunit is specifically configured to implement, in the following manners, the determining, according to a second preset manner, the channel for transmitting the HARQ-ACK:

when a PUSCH is transmitted in an uplink carrier corresponding to only the first base station in the current subframe, determining that the channel for transmitting the HARQ-ACK is the PUSCH transmitted in the uplink carrier corresponding to the first base station;

when a PUSCH is transmitted in an uplink carrier corresponding to only the second base station in the current subframe, determining that the channel for transmitting the HARQ-ACK is the PUSCH transmitted in the uplink carrier corresponding to the second base station; or determining that the channel for transmitting the HARQ-ACK is a PUCCH.

With reference to the third aspect, and/or the first possible implementation manner, and/or the second possible implementation manner, and/or the third possible implementation manner, and/or the fourth possible implementation manner, and/or the fifth possible implementation manner, in a sixth possible implementation manner, the first base station is a macro base station, and the second base station is a micro base station.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the bit determining unit includes:

a first number determining subunit, configured to determine, according to HARQ-ACK timing of each carrier, the number of downlink subframes corresponding to the current subframe for each carrier; and a bit determining subunit, configured to determine the HARQ-ACK feedback bit based on the number of downlink subframes determined by the first number determining subunit, where, the HARQ-ACK timing of each carrier includes: when at least one carrier uses an FDD manner and at least one carrier uses a TDD manner in carriers for carrier aggregation for the user equipment, if detecting, in subframe n, a PDSCH or a PDCCH indicating semi-persistent scheduling release in the carrier that uses the TDD manner, the UE shall determine to feed back a HARQ-ACK corresponding to the PDSCH or the PDCCH in subframe n+4.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the bit determining subunit is specifically configured to:

when it is determined that the channel for transmitting the HARQ-ACK is a PUCCH, determine the HARQ-ACK feedback bit based on the number of carriers configured for the UE, a transmission mode of each carrier, and the number of downlink subframes corresponding to the current subframe for each carrier; and when it is determined that the channel for transmitting the HARQ-ACK is a PUSCH, determine the HARQ-ACK feedback bit based on a first configured carrier set, a transmission mode of each carrier in the first configured carrier set, and the number of downlink subframes corresponding to the current subframe for each carrier, where the first configured carrier set includes all downlink carriers corresponding to the PUSCH in downlink carriers configured for the UE, where the downlink carriers corresponding to the PUSCH are downlink carriers corresponding to a base station corresponding to the PUSCH.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, when it is determined that the channel for transmitting the HARQ-ACK is a PUCCH, the sending unit includes:

a first resource determining subunit, configured to determine a PUCCH resource for transmitting the HARQ-ACK; and a transmitting subunit, configured to send the HARQ-ACK feedback bit by using the PUCCH resource.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, when a channel format of the PUCCH is format 3, and when the current subframe is configured to transmit a scheduling request, the first resource determining subunit is specifically configured to:

reserve a PUCCH resource for each base station; and determine, according to a base station corresponding to the scheduling request that the current subframe is configured to transmit, the PUCCH resource reserved for the base station as the PUCCH resource for transmitting the HARQ-ACK; or reserve a PUCCH resource; determine a PUCCH resource index, and obtain a sequence index of an orthogonal sequence of the PUCCH according to the resource index; determine, according to a base station corresponding to the scheduling request that the current subframe is configured to transmit, a cyclic shift of a sequence index preset for the base station as a cyclic shift of a reference signal; and determine the reserved PUCCH resource that uses the cyclic shift of the reference signal, as the PUCCH resource for transmitting the HARQ-ACK.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, when a channel format of the PUCCH is format 1b, and when the current subframe is configured to transmit a scheduling request, the first resource determining subunit is specifically configured to:

reserve a PUCCH resource for each base station; and determine, according to a base station corresponding to the scheduling request that the current subframe is configured to transmit, the PUCCH resource reserved for the base station as the PUCCH resource for transmitting the HARQ-ACK.

According to a fourth aspect, an apparatus for transmitting a HARQ-ACK is provided, including:

a second determining unit, configured to determine a channel used by a UE for transmitting a HARQ-ACK;

a bit number determining unit, configured to determine the number of bits of the HARQ-ACK transmitted by the UE; and a detecting unit, configured to detect the HARQ-ACK on the channel according to the number of bits.

With reference to the fourth aspect, in a first possible implementation manner, the second determining unit is specifically configured to:

when the UE is configured to support simultaneous transmission of a PUSCH and a PUCCH, determine that the channel used by the UE for transmitting the HARQ-ACK is a PUCCH;

when the UE is not configured to support simultaneous transmission of a PUSCH and a PUCCH, and no PUSCH is transmitted in a current subframe, determine that the channel used by the UE for transmitting the HARQ-ACK is a PUCCH; and/or when the UE is not configured to support simultaneous transmission of a PUSCH and a PUCCH, and a PUSCH is transmitted in the current subframe, determine that the channel used by the UE for transmitting the HARQ- ACK is a PUCCH and PUSCH, and that the PUCCH has a higher priority than the PUSCH, where the current subframe is a subframe for transmitting the HARQ-ACK.

With reference to the fourth aspect, and/or the first possible implementation manner, in a second possible implementation manner, the bit number determining unit includes:
  a second number determining subunit, configured to determine, according to HARQ-ACK timing of each carrier, the number of downlink subframes corresponding to the current subframe for each carrier; and
  a bit number determining subunit, configured to determine the number of bits of the HARQ-ACK based on the number of downlink subframes corresponding to the current subframe for each carrier,
  where, the HARQ-ACK timing of each carrier includes: when at least one carrier uses an FDD manner and at least one carrier uses a TDD manner in carriers for carrier aggregation for the user equipment, if detecting, in subframe n, a PDSCH or a PDCCH indicating semi-persistent scheduling release in the carrier that uses the TDD manner, the UE shall determine to feed back a HARQ-ACK corresponding to the PDSCH or the PDCCH in subframe n+4.

With reference to the fourth aspect, and/or the first possible implementation manner, and/or the second possible implementation manner, in a third possible implementation manner, the bit number determining subunit is specifically configured to:
  when it is determined that the channel used by the UE for transmitting the HARQ-ACK is a PUCCH, determine the number of bits of the HARQ-ACK based on the number of carriers configured for the UE, a transmission mode of each carrier, and the number of downlink subframes corresponding to the current subframe for each carrier; and
  when it is determined that the channel used by the UE for transmitting the HARQ-ACK is a PUSCH, determine the number of bits of the HARQ-ACK based on a second configured carrier set, a transmission mode of each carrier in the second configured carrier set, and the number of downlink subframes corresponding to the current subframe for each carrier,
  where the second configured carrier set includes all downlink carriers configured by the base station for the UE.

With reference to the fourth aspect, and/or the first possible implementation manner, and/or the second possible implementation manner, and/or the third possible implementation manner, in a fourth possible implementation manner, when it is determined that the channel used by the UE for transmitting the HARQ-ACK is a PUCCH, the detecting unit includes:
  a second resource determining subunit, configured to determine a PUCCH resource used by the UE for transmitting the HARQ-ACK; and
  a detecting subunit, configured to detect the HARQ-ACK on the PUCCH resource according to the number of bits.

With reference to the fourth aspect, and/or the first possible implementation manner, and/or the second possible implementation manner, and/or the third possible implementation manner, and/or the fourth possible implementation manner, in a fifth possible implementation manner, the detecting subunit is further configured to:
  detect scheduling request information on the PUCCH resource, and determine, according to the determined PUCCH resource, a base station corresponding to the scheduling request information request, where the base station corresponding to the scheduling request is a base station from which an uplink resource is requested by the scheduling request.

With reference to the fourth aspect, and/or the first possible implementation manner, and/or the second possible implementation manner, and/or the third possible implementation manner, and/or the fourth possible implementation manner, and/or the fifth possible implementation manner, in a sixth possible implementation manner, the PUCCH resource is a resource semi-statically reserved by the base station for the user equipment, and the base station transmits information indicating the semi-statically reserved PUCCH resource to another base station through an X2 interface.

According to a fifth aspect, a user equipment UE for transmitting a HARQ-ACK is provided, including a first data processor and a first radio transceiver, where:
  the first data processor is configured to determine a channel for transmitting a HARQ-ACK, and determine a HARQ-ACK feedback bit; and
  the first radio transceiver is configured to send the HARQ-ACK feedback bit on the channel determined by the data processor.

With reference to the fifth aspect, in a first possible implementation manner, the first data processor is specifically configured to implement, in the following manners, the determining a channel for transmitting a HARQ-ACK:
  when the UE is configured to support simultaneous transmission of a PUSCH and a PUCCH, determining that the channel for transmitting the HARQ-ACK is a PUCCH;
  when the UE is not configured to support simultaneous transmission of a PUSCH and a PUCCH, and no PUSCH is transmitted in a current subframe, determining that the channel for transmitting the HARQ-ACK is a PUCCH; and/or
  when the UE is not configured to support simultaneous transmission of a PUSCH and a PUCCH, and a PUSCH is transmitted in the current subframe, determining, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK,
  where the current subframe is a subframe for transmitting the HARQ-ACK.

With reference to the fifth aspect and/or the first possible implementation manner, in a second possible implementation manner, the base stations include a first base station and a second base station;
  the first data processor is specifically configured to implement, in the following manners, the determining, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK:
  when the UE only detects that a PDSCH and/or a PDCCH indicating semi-persistent scheduling release is transmitted in a downlink carrier corresponding to the first base station, and a PUSCH is transmitted in an uplink carrier corresponding to the first base station in the current subframe, determining that the channel for transmitting the HARQ-ACK is the PUSCH transmitted in the uplink carrier corresponding to the first base station;

when the UE only detects that a PDSCH and/or a PDCCH indicating semi-persistent scheduling release is transmitted in a downlink carrier corresponding to the second base station, and a PUSCH is transmitted in an uplink carrier corresponding to the second base station in the current subframe, determining that the channel for transmitting the HARQ-ACK is the PUSCH transmitted in the uplink carrier corresponding to the second base station;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and PUSCHs are transmitted in uplink carriers corresponding to both the first base station and the second base station in the current subframe, determining, according to a first preset manner, the channel for transmitting the HARQ-ACK;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and a PUSCH is transmitted in an uplink carrier corresponding to only the first base station or the second base station in the current subframe, determining, according to a second preset manner, the channel for transmitting the HARQ-ACK;

when the UE only detects that a PDSCH and/or a PDCCH indicating semi-persistent scheduling release is transmitted in a downlink carrier corresponding to the first base station, and a PUSCH is transmitted in an uplink carrier corresponding to only the second base station in the current subframe, determining that the channel for transmitting the HARQ-ACK is a PUCCH; or when the UE only detects that a PDSCH and/or a PDCCH indicating semi-persistent scheduling release is transmitted in a downlink carrier corresponding to the second base station, and a PUSCH is transmitted in an uplink carrier corresponding to only the first base station in the current subframe, determining that the channel for transmitting the HARQ-ACK is a PUCCH.

With reference to the fifth aspect, and/or the first possible implementation manner, and/or the second possible implementation manner, in a third possible implementation manner, the first data processor is specifically configured to implement, in the following manners, the determining, according to a first preset manner, the channel for transmitting the HARQ-ACK:

determining that the channel for transmitting the HARQ-ACK is a PUSCH transmitted in an uplink carrier corresponding to the first base station; or determining that the channel for transmitting the HARQ-ACK is a PUSCH transmitted in an uplink carrier corresponding to the second base station; or determining that the channel for transmitting the HARQ-ACK is a PUCCH; or determining that the channel for transmitting the HARQ-ACK is a PUSCH transmitted in an uplink carrier corresponding to the first base station and a PUSCH transmitted in an uplink carrier corresponding to the second base station; or determining, according to a preset priority condition, the channel for transmitting the HARQ-ACK.

With reference to the fifth aspect, and/or the first possible implementation manner, and/or the second possible implementation manner, and/or the third possible implementation manner, in a fourth possible implementation manner, the preset priority condition is a HARQ-ACK transmission priority of each base station; and therefore, the first data processor is specifically configured to implement, in the following manners, the determining, according to a preset priority condition, the channel for transmitting the HARQ-ACK:

determining, according to the HARQ-ACK transmission priority of each base station, that the channel for transmitting the HARQ-ACK is a PUSCH transmitted in an uplink carrier corresponding to a base station of a higher transmission priority;

or, the preset priority condition is a priority of a PUSCH transmitted in a carrier corresponding to each base station; and therefore, the determining, according to a preset priority condition, the channel for transmitting the HARQ-ACK includes:

determining, according to the priorities of PUSCHs, that the channel for transmitting the HARQ-ACK is a PUSCH of a higher priority.

With reference to the fifth aspect, and/or the first possible implementation manner, and/or the second possible implementation manner, and/or the third possible implementation manner, and/or the fourth possible implementation manner, in a fifth possible implementation manner, the first data processor is specifically configured to implement, in the following manners, the determining, according to a second preset manner, the channel for transmitting the HARQ-ACK:

when a PUSCH is transmitted in an uplink carrier corresponding to only the first base station in the current subframe, determining that the channel for transmitting the HARQ-ACK is the PUSCH transmitted in the uplink carrier corresponding to the first base station; when a PUSCH is transmitted in an uplink carrier corresponding to only the second base station in the current subframe, determining that the channel for transmitting the HARQ-ACK is the PUSCH transmitted in the uplink carrier corresponding to the second base station; or determining that the channel for transmitting the HARQ-ACK is a PUCCH.

With reference to the fifth aspect, and/or the first possible implementation manner, and/or the second possible implementation manner, and/or the third possible implementation manner, and/or the fourth possible implementation manner, and/or the fifth possible implementation manner, in a sixth possible implementation manner, the first base station is a macro base station, and the second base station is a micro base station.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the first data processor is specifically configured to implement, in the following manners, the determining a HARQ-ACK feedback bit:

determining, according to HARQ-ACK timing of each carrier, the number of downlink subframes corresponding to the current subframe for each carrier; and determining the HARQ-ACK feedback bit based on the number of downlink subframes corresponding to the current subframe for each carrier, where, the HARQ-ACK timing of each carrier includes: when at least one carrier uses an FDD manner and at least one carrier uses a TDD manner in carriers for carrier aggregation for the user equipment, if detecting, in subframe n, a PDSCH or a PDCCH indicating semi-persistent scheduling release in the carrier that uses the TDD manner, the UE shall determine to feed back a HARQ-ACK corresponding to the PDSCH or the PDCCH in subframe n+4.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the first data processor is specifically configured to implement, in the following manners, the determining the HARQ-ACK feedback bit based on the number of downlink subframes corresponding to the current subframe for each carrier:

when determining that the channel for transmitting the HARQ-ACK is a PUCCH, determining the HARQ-ACK feedback bit based on the number of carriers configured for the UE, a transmission mode of each carrier, and the number of downlink subframes corresponding to the current subframe for each carrier; and/or when determining that the channel for transmitting the HARQ-ACK is a PUSCH, determining the HARQ-ACK feedback bit based on a first configured carrier set, a transmission mode of each carrier in the first configured carrier set, and the number of downlink subframes corresponding to the current subframe for each carrier, where the first configured carrier set includes all downlink carriers corresponding to the PUSCH in downlink carriers configured for the UE, where the downlink carriers corresponding to the PUSCH are downlink carriers corresponding to a base station corresponding to the PUSCH.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, when it is determined that the channel for transmitting the HARQ-ACK is a PUCCH, the first radio transceiver is specifically configured to:

determine a PUCCH resource for transmitting the HARQ-ACK; and send the HARQ-ACK feedback bit by using the PUCCH resource.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, when a channel format of the PUCCH is format 3, and when the current subframe is configured to transmit a scheduling request, the first radio transceiver is specifically configured to implement, in the following manners, the determining a PUCCH resource for transmitting the HARQ-ACK:

reserving a PUCCH resource for each base station; and determining, according to a base station corresponding to the scheduling request that the current subframe is configured to transmit, the PUCCH resource reserved for the base station as the PUCCH resource for transmitting the HARQ-ACK; or reserving a PUCCH resource; determining a PUCCH resource index, and obtaining a sequence index of an orthogonal sequence of the PUCCH according to the resource index; determining, according to a base station corresponding to the scheduling request that the current subframe is configured to transmit, a cyclic shift of a sequence index preset for the base station as a cyclic shift of a reference signal; and determining the reserved PUCCH resource that uses the cyclic shift of the reference signal, as the PUCCH resource for transmitting the HARQ-ACK.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, when a channel format of the PUCCH is format 1b, and when the current subframe is configured to transmit a scheduling request, the first radio transceiver is specifically configured to implement, in the following manners, the determining a PUCCH resource for transmitting the HARQ-ACK:

reserving a PUCCH resource for each base station; and determining, according to a base station corresponding to the scheduling request that the current subframe is configured to transmit, the PUCCH resource reserved for the base station as the PUCCH resource for transmitting the HARQ-ACK.

According to a sixth aspect, a base station for transmitting a HARQ-ACK is provided, including a second data processor and a second radio transceiver, where:

the second data processor is configured to determine a channel used by a UE for transmitting a HARQ-ACK, and determine the number of bits of the HARQ-ACK transmitted by the UE; and the second radio transceiver is configured to detect the HARQ-ACK on the channel according to the number of bits.

With reference to the sixth aspect, in a first possible implementation manner, the second data processor is specifically configured to implement, in the following manners, the determining a channel used by a UE for transmitting a HARQ-ACK:

when the UE is configured to support simultaneous transmission of a PUSCH and a PUCCH, determining that the channel used by the UE for transmitting the HARQ-ACK is a PUCCH;

when the UE is not configured to support simultaneous transmission of a PUSCH and a PUCCH, and no PUSCH is transmitted in a current subframe, determining that the channel used by the UE for transmitting the HARQ-ACK is a PUCCH; and/or when the UE is not configured to support simultaneous transmission of a PUSCH and a PUCCH, and a PUSCH is transmitted in the current subframe, determining that the channel used by the UE for transmitting the HARQ-ACK is a PUCCH and PUSCH, and that the PUCCH has a higher priority than the PUSCH, where the current subframe is a subframe for transmitting the HARQ-ACK.

With reference to the sixth aspect, and/or the first possible implementation manner, in a second possible implementation manner, the second data processor is specifically configured to implement, in the following manners, the determining the number of bits of the HARQ-ACK transmitted by the UE:

determining, according to HARQ-ACK timing of each carrier, the number of downlink subframes corresponding to the current subframe for each carrier; and determining the number of bits of the HARQ-ACK based on the number of downlink subframes corresponding to the current subframe for each carrier;

where, the HARQ-ACK timing of each carrier includes:
when at least one carrier uses an FDD manner and at least one carrier uses a TDD manner in carriers for carrier aggregation for the user equipment, if detecting, in subframe n, a PDSCH or a PDCCH indicating semi-persistent scheduling release in the carrier that uses the TDD manner, the UE shall determine to feed back a HARQ-ACK corresponding to the PDSCH or the PDCCH in subframe n+4.

With reference to the sixth aspect, and/or the first possible implementation manner, and/or the second possible implementation manner, in a third possible implementation manner, the second data processor is specifically configured to implement, in the following manners, the determining the number of bits of the HARQ-ACK based on the number of downlink subframes corresponding to the current subframe for each carrier:

when determining that the channel used by the UE for transmitting the HARQ-ACK is a PUCCH, determining the number of bits of the HARQ-ACK based on the number of carriers configured for the UE, a transmission mode of each carrier, and the number of downlink subframes corresponding to the current subframe for each carrier; and when determining that the channel used by the UE for transmitting the HARQ-ACK is a PUSCH, determining the number of bits of the HARQ-ACK based on a second configured carrier set, a transmission mode of each carrier in the second configured carrier set, and the number of downlink subframes corresponding to the current subframe for each carrier, where the second configured carrier set includes all downlink carriers configured by the base station for the UE.

With reference to the sixth aspect, and/or the first possible implementation manner, and/or the second possible implementation manner, and/or the third possible implementation manner, in a fourth possible implementation manner, when it is determined that the channel used by the UE for transmitting the HARQ-ACK is a PUCCH, the second radio transceiver is specifically configured to:

determine a PUCCH resource used by the UE for transmitting the HARQ-ACK; and detect the HARQ-ACK on the PUCCH resource according to the number of bits.

With reference to the sixth aspect, and/or the first possible implementation manner, and/or the second possible implementation manner, and/or the third possible implementation manner, and/or the fourth possible implementation manner, in a fifth possible implementation manner, the second radio transceiver is further configured to detect scheduling request information on the PUCCH resource, and determine, according to the determined PUCCH resource, a base station corresponding to the scheduling request information request, where the base station corresponding to the scheduling request is a base station from which an uplink resource is requested by the scheduling request.

With reference to the sixth aspect, and/or the first possible implementation manner, and/or the second possible implementation manner, and/or the third possible implementation manner, and/or the fourth possible implementation manner, and/or the fifth possible implementation manner, in a sixth possible implementation manner, the PUCCH resource is a resource semi-statically reserved by the base station for the user equipment, and the base station transmits information indicating the semi-statically reserved PUCCH resource to another base station through an X2 interface.

In the embodiments of the present disclosure, a channel for transmitting a HARQ-ACK is determined, and the HARQ-ACK and transmission time of the HARQ-ACK are determined; and at the transmission time, the HARQ-ACK is sent through the channel. Therefore, in a scenario where carrier aggregation is performed between base stations having a non-ideal backhaul, a UE can transmit the HARQ-ACK to a base station.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
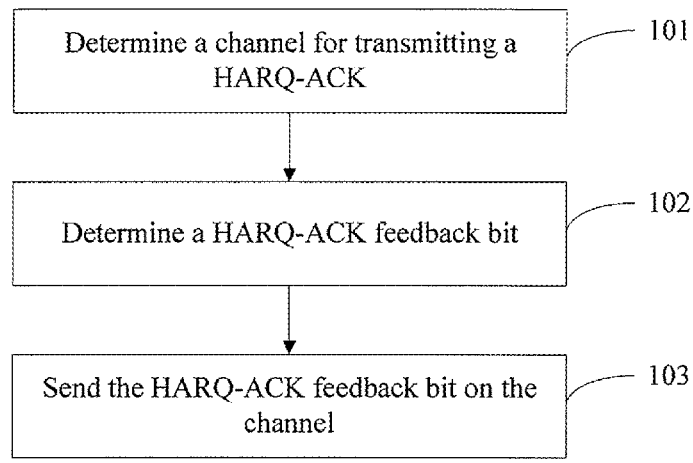
FIG. 1 is a flowchart of a first embodiment of a method for transmitting a HARQ-ACK according to the present disclosure.

If carrier aggregation between base stations having a non-ideal backhaul is introduced in an LTE-A system, no method for transmitting a HARQ-ACK between a UE and a base station exists in the prior art. Therefore, the embodiments of the present disclosure provide a method, an apparatus, a UE, and a base station for transmitting a HARQ-ACK, which can implement transmission of a HARQ-ACK between a UE and a base station in a scenario where carrier aggregation is performed between base stations having a non-ideal backhaul.

Further, only carrier aggregation between a macro base station and a micro base station that have an ideal backhaul exists in the prior art.

In a scenario where carrier aggregation is performed between a macro base station and a micro base station that have an ideal backhaul, when the UE needs to feed back a HARQ-ACK to the micro base station, the UE sends the HARQ-ACK to the macro base station, and then the macro base station forwards the HARQ-ACK to the micro base station. Because an ideal backhaul exists between the macro base station and the micro base station, both the macro base station and the micro base station can obtain in real time the HARQ-ACK fed back by the UE.

However, if the method is used in a scenario where carrier aggregation is performed between the macro base station and the micro base station that have a non-ideal backhaul, because a non-ideal backhaul exists between the macro base station and the micro base station, data cannot be transmitted in real time, and the macro base station cannot transmit the HARQ-ACK to the micro base station in real time. Therefore, receiving, by the micro base station, the HARQ-ACK fed back by the UE is delayed, and further, scheduling of downlink data by the micro base station for the UE is delayed.

The method, the apparatus, the UE, and the base station for transmitting a HARQ-ACK in the embodiments of the present disclosure, in comparison with the scenario of the present disclosure using the method for transmitting uplink control information in the scenario where carrier aggregation is performed between the macro base station and the micro base station that have an ideal backhaul in the prior art, can reduce the delay in obtaining the HARQ-ACK by the micro base station and reduce time of performing downlink data scheduling by the micro base station for the UE.

In addition, it should be noted that the method for transmitting a HARQ-ACK in the embodiments of the present disclosure may be applied to a scenario where carrier aggregation is performed between n base stations having a non-ideal backhaul, where n is an integer not less than 2. A base station in the n base stations may be a macro base station or a micro base station and so on.

The current subframe in the embodiments of the present disclosure is a subframe for transmitting the HARQ-ACK. The base station is a base station in the scenario where carrier aggregation is performed between the n base stations having a non-ideal backhaul, that is, any base station in the n base stations. The UE is a UE that needs to send the HARQ-ACK to the n base stations in the scenario where carrier aggregation is performed between the n base stations having a non-ideal backhaul.

The description about whether a PUCCH is transmitted in a carrier in the embodiments of the present disclosure is a simplified description about whether data transmission through the PUCCH exists in the carrier, and is a description well known by a person skilled in the art. Other descriptions about PUCCH transmission in the embodiments of the present disclosure are similar to the above. Other descriptions about a PUSCH in the embodiments of the present disclosure are also similar to the above and are not further described in detail.

In order that a person skilled in the art better understand the technical solutions of the embodiments of the present disclosure, and in order to make the above objective, features, and advantages of the embodiments of the present disclosure more comprehensible, the technical solutions of the embodiments of the present disclosure are hereinafter described in detail with reference to the accompanying drawings.

FIG. 1 is a flowchart of an embodiment of a method for transmitting a HARQ-ACK according to the present disclosure, where the method may be applied to a UE. As shown in FIG. 1, the method includes:

Step 101: Determine a channel for transmitting a HARQ-ACK.

Preferably, this step may include:

when the UE is configured to support simultaneous transmission of a PUSCH and a PUCCH, determining that the channel for transmitting the HARQ-ACK is a PUCCH;

when the UE is not configured to support simultaneous transmission of a PUSCH and a PUCCH, and no PUSCH is transmitted in a current subframe, determining that the channel for transmitting the HARQ-ACK is a PUCCH; and/or when the UE is not configured to support simultaneous transmission of a PUSCH and a PUCCH, and a PUSCH is transmitted in the current subframe, determining, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK, where each base station is a base station in the n base stations.

When it is determined that the channel for transmitting the HARQ-ACK is a PUCCH, the uplink carrier where the PUCCH is located and the base station corresponding to the uplink carrier may be determined according to a specific condition in an actual application.

For example, assuming that an uplink primary carrier in the carrier aggregation scenario is designated beforehand in uplink carriers corresponding to the n base stations performing carrier aggregation, when it is determined that the channel for transmitting the HARQ-ACK is a PUCCH, the PUCCH may be a PUCCH in the uplink primary carrier in the carrier aggregation scenario. For example, if uplink carrier B corresponding to base station A in the n base stations is designated as an uplink primary carrier in the carrier aggregation scenario, the PUCCH may be a PUCCH in uplink carrier B corresponding to base station A.

Alternatively, if no uplink primary carrier in the carrier aggregation scenario is designated, but for each base station in the n base stations, an uplink primary carrier corresponding to the base station is designated, when it is determined that the channel for transmitting the HARQ-ACK is a PUCCH, the PUCCH may be a PUCCH in the uplink primary carrier corresponding to the base station accessed by the UE.

Step 102: Determine a HARQ-ACK feedback bit.

The execution sequence of step 101 and step 102 is not limited.

Preferably, the determining a HARQ-ACK feedback bit may include:
  determining, according to HARQ-ACK timing of each carrier, the number of downlink subframes corresponding to the current subframe for each carrier; and
  determining the HARQ-ACK feedback bit based on the number of downlink subframes corresponding to the current subframe for each carrier.

The HARQ-ACK timing of each carrier is:
  when at least one carrier uses a frequency division duplex (FDD) manner and at least one carrier uses a time division duplex (TDD) manner in carriers for carrier aggregation, if detecting, in subframe n, a PDSCH or a PDCCH indicating semi-persistent scheduling release in the carrier that uses the TDD manner, the UE shall determine to feed back a HARQ-ACK in subframe n+4, where the HARQ-ACK fed back in subframe n+4 is a HARQ-ACK corresponding to the PDSCH or the PDCCH indicating semi-persistent scheduling release which is detected in subframe n.

When all carriers for carrier aggregation use the FDD manner or the TDD manner, determining transmission time of the HARQ-ACK may be implemented with reference to the description in an existing standard. For example, when all carriers corresponding to a first base station and a second base station use the FDD manner, the HARQ-ACK corresponding to the PDSCH or the PDCCH indicating semi-persistent scheduling release which is received in subframe n is fed back in subframe n+4.

The downlink subframe corresponding to the current subframe means that the HARQ-ACK of the downlink subframe is fed back in the current subframe.

Preferably, the determining the HARQ-ACK feedback bit based on the number of downlink subframes corresponding to the current subframe for each carrier may include:
  when determining, in step 101, that the channel for transmitting the HARQ-ACK is a PUCCH, determining the HARQ-ACK feedback bit based on the number of carriers configured for the UE, a transmission mode of each carrier, and the number of downlink subframes corresponding to the current subframe for each carrier; and/or
  when determining that the channel for transmitting the HARQ-ACK is a PUSCH, determining the HARQ-ACK feedback bit based on a first configured carrier set, a transmission mode of each carrier in the first configured carrier set, and the number of downlink subframes corresponding to the current subframe for each carrier, where the first configured carrier set includes all downlink carriers corresponding to the determined PUSCH in downlink carriers configured for the UE, where the downlink carriers corresponding to the PUSCH are downlink carriers corresponding to a base station corresponding to the PUSCH.

Step 103: Send the HARQ-ACK feedback bit on the channel.

Preferably, when the determined channel for sending the HARQ-ACK in step 101 is a PUCCH, the transmitting the HARQ-ACK through the channel may include:
  determining a PUCCH resource for transmitting the HARQ-ACK; and
  sending the HARQ-ACK feedback bit by using the PUCCH resource.

When a channel format of the PUCCH is format 3, and when the current subframe is configured to transmit a scheduling request, the determining a PUCCH resource for transmitting the HARQ-ACK may be implemented in at least two manners:

In the first implementation manner, a higher layer may reserve a PUCCH resource for each base station; in this case, the determining a PUCCH resource for transmitting the HARQ-ACK may include:
  reserving a PUCCH resource for each base station; and
  determining, according to a base station corresponding to the scheduling request that the current subframe is configured to transmit, the PUCCH resource reserved for the base station as the PUCCH resource for transmitting the HARQ-ACK.

In the second implementation manner, a higher layer reserves a PUCCH resource for all base stations; for different base stations, cyclic shifts of reference signals in the reserved PUCCH resource are different, so as to distinguish the difference of the base stations that use the PUCCH resource to transmit data. In this case, the determining a PUCCH resource for transmitting the HARQ-ACK may include:
  reserving a PUCCH resource; determining a PUCCH resource index, and obtaining a sequence index of an orthogonal sequence of the PUCCH according to the resource index; determining, according to the sequence index, a cyclic shift of a reference signal; and determining the reserved PUCCH resource that uses the cyclic shift, as the PUCCH resource for transmitting the HARQ-ACK.

Preferably, the determining, according to the sequence index, a cyclic shift of a reference signal includes:
  presetting a cyclic shift of a sequence index corresponding to each base station; and
  determining, according to a base station corresponding to the scheduling request that the current subframe is configured to transmit, the cyclic shift of the reference signal as a cyclic shift of the sequence index corresponding to the base station.

When a channel format of the PUCCH is format 1b, and when the current subframe is configured to transmit a scheduling request, the determining a PUCCH resource for transmitting the HARQ-ACK includes:
  reserving a PUCCH resource for each base station; and
  determining, according to a base station corresponding to the scheduling request that the subframe transmitting the HARQ-ACK information is configured to transmit, the PUCCH resource reserved for the base station as the PUCCH resource for transmitting the HARQ-ACK.

How the UE sends, at the transmission time, the HARQ-ACK by using the PUCCH resource is not further described herein.

The higher layer may be a base station or an upper layer of the base station.

In the method for transmitting a HARQ-ACK shown in FIG. 1, a UE determines a channel for transmitting a HARQ-ACK and determines a HARQ-ACK feedback bit, and sends the HARQ-ACK feedback bit on the channel. Therefore, the UE can send the HARQ-ACK to a base station.

Figure 2:
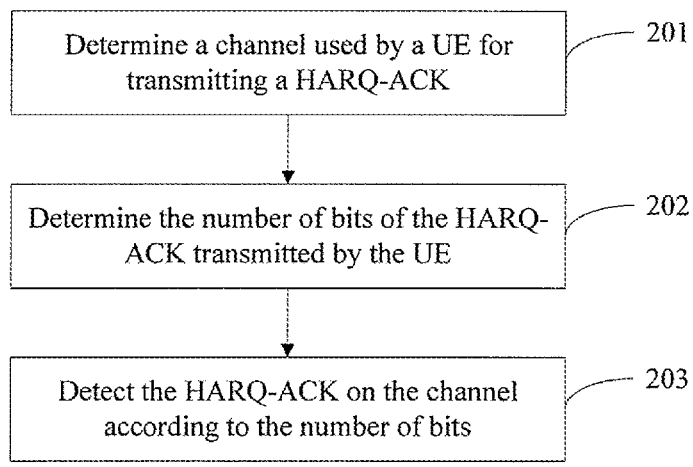
FIG. 2 is a flowchart of a second embodiment of a method for transmitting a HARQ-ACK according to the present disclosure.

FIG. 2 is a flowchart of another embodiment of a method for transmitting a HARQ-ACK according to the present disclosure. The method may be applied to a base station, where the base station is any base station in the n base stations; the base station may be a macro base station or a micro base station and so on. As shown in FIG. 2, the method includes:

Step 201: Determine a channel used by a UE for transmitting a HARQ-ACK.

Preferably, the determining a channel used by a UE for transmitting a HARQ-ACK may include:
when the UE is configured to support simultaneous transmission of a PUSCH and a PUCCH, determining that the channel used by the UE for transmitting the HARQ-ACK is a PUCCH;
when the UE is not configured to support simultaneous transmission of a PUSCH and a PUCCH, and no PUSCH is transmitted in a current subframe, determining that the channel used by the UE for transmitting the HARQ-ACK is a PUCCH; and/or
when the UE is not configured to support simultaneous transmission of a PUSCH and a PUCCH, and a PUSCH is transmitted in the current subframe, determining that the channel used by the UE for transmitting the HARQ-ACK is a PUCCH and PUSCH, and that the PUCCH has a higher priority than the PUSCH.

The PUSCH determined in this step is a PUSCH in an uplink carrier corresponding to the base station.

The method for the base station to determine the channel used by the UE for transmitting the HARQ-ACK should correspond to the method for the UE to determine the channel for transmitting the HARQ-ACK in step 101. Therefore, the UE can send the HARQ-ACK through the corresponding channel in the corresponding carrier and the base station can detect the HARQ-ACK through the corresponding channel in the corresponding carrier, thereby implementing the transmission of the HARQ-ACK between the UE and the base station. Therefore, in this step, when the base station determines that the channel used by the UE for transmitting the HARQ-ACK is a PUCCH, specifically, for which uplink carrier the PUCCH channel should be located in, reference may be made to the related description of determining the PUCCH by the UE in step 101, and the determining in this step needs to correspond to the policy of determining a PUCCH by the UE in step 101.

For example, if the determined channel used by the UE for transmitting the HARQ-ACK is a PUCCH in an uplink primary carrier in the carrier aggregation scenario, when the base station determines, in this step, that the channel for transmitting the HARQ-ACK is a PUCCH, the PUCCH should also be the PUCCH in the uplink primary carrier in the carrier aggregation scenario.

If the determined channel used by the UE for transmitting the HARQ-ACK is a PUCCH in an uplink primary carrier corresponding to the base station accessed by the UE, when the base station determines, in this step, that the channel for transmitting the HARQ-ACK is a PUCCH, the PUCCH should also be the PUCCH in the uplink primary carrier corresponding to the base station accessed by the UE.

Step 202: Determine the number of bits of the HARQ-ACK transmitted by the UE.

The execution sequence of step 201 and step 202 is not limited.

Preferably, the determining the number of bits of the HARQ-ACK transmitted by the UE includes:
determining, according to HARQ-ACK timing of each carrier, the number of downlink subframes corresponding to the current subframe for each carrier; and
determining the number of bits of the HARQ-ACK based on the number of downlink subframes corresponding to the current subframe for each carrier.

The HARQ-ACK timing of each carrier is:
when at least one carrier uses an FDD manner and at least one carrier uses a TDD manner in carriers for carrier aggregation for the user equipment, if detecting, in subframe n, a PDSCH or a PDCCH indicating semi-persistent scheduling release in the carrier that uses the TDD manner, the UE shall determine to feed back a HARQ-ACK in subframe n+4. The HARQ-ACK fed back in subframe n+4 should be a HARQ-ACK corresponding to the PDSCH or the PDCCH indicating semi-persistent scheduling release which is scheduled for the UE in subframe n.

When all carriers for carrier aggregation use the FDD manner or the TDD manner, determining transmission time of the HARQ-ACK may be implemented with reference to the description in an existing standard. For example, when all carriers corresponding to a first base station and a second base station use the FDD manner, the HARQ-ACK corresponding to the PDSCH or the PDCCH indicating semi-persistent scheduling release which is received in subframe n is fed back in subframe n+4.

The determining the number of bits of the HARQ-ACK based on the number of downlink subframes corresponding to the current subframe for each carrier may include:
(1) when determining that the channel used by the UE for transmitting the HARQ-ACK is a PUCCH, determining the number of bits of the HARQ-ACK based on the number of carriers configured for the UE, a transmission mode of each carrier, and the number of downlink subframes corresponding to the current subframe for each carrier; and
(2) when determining that the channel used by the UE for transmitting the HARQ-ACK is a PUSCH, determining the number of bits of the HARQ-ACK based on a second configured carrier set, a transmission mode of each carrier in the second configured carrier set, and the number of downlink subframes corresponding to the current subframe for each carrier, where the second configured carrier set includes all downlink carriers configured by the base station for the UE.

For the case of determining, in step 201, that the channel for transmitting the HARQ-ACK is a PUCCH and a PUSCH, the number of bits corresponding to the PUCCH and PUSCH needs to be determined respectively according to the method for determining the number of bits described in (1) and (2). Specifically, for the determined PUCCH, the number of bits of the acknowledgement information is determined according to the method corresponding to the PUCCH in (1); for the determined PUSCH, the number of bits of the acknowledgement information is determined according to the method corresponding to the PUSCH in (2).

The specific implementation method for determining the number of bits of the HARQ-ACK is exemplified as follows:

For example, the number of bits of the HARQ-ACK is determined through the following formula: subframe $O^{ACK}=N_{subframe} \cdot (C+C_2)$, where, $O^{ACK}$ is the number of bits of the HARQ-ACK, $N_{subframe}$ is the number of downlink subframes corresponding to the current subframe, C is the number of configured carriers, and $C_2$ is the number of carriers where a configured transmission mode may support dual-codeword transmission. When all carriers using the TDD manner use timing of hybrid automatic repeat request-acknowledgement information in the FDD manner, $N_{subframe}=1$.

Step 203: Detect the HARQ-ACK on the channel according to the number of bits.

Assuming that it is determined, in step 201, that the channel used by the UE for transmitting the HARQ-ACK is a PUCCH, the HARQ-ACK only needs to be detected directly on the PUCCH in this step.

Assuming that it is determined, in step 201, that the channel used by the UE for transmitting the HARQ-ACK is a PUCCH and a PUSCH, and when the PUCCH has a higher priority than the PUSCH, the detecting the HARQ-ACK on the channel may include:

first detecting the HARQ-ACK on the PUCCH; and
when the HARQ-ACK is not detected on the PUCCH, detecting the HARQ-ACK on the PUSCH.

Preferably, assuming that it is determined, in step 201, that the channel used by the UE for transmitting the HARQ-ACK is a PUCCH, or when the HARQ-ACK is first detected on the PUCCH in this step, the detecting the HARQ-ACK on the PUCCH may include:

determining a PUCCH resource used by the UE for transmitting the HARQ-ACK; and
detecting the HARQ-ACK on the PUCCH resource according to the number of bits.

In addition, apart from detecting the HARQ-ACK on the PUCCH resource, the method may further include:

detecting scheduling request information on the PUCCH resource, and determining, according to the determined PUCCH resource, a base station corresponding to the scheduling request information request, where the base station corresponding to the scheduling request is a base station from which an uplink resource is requested by the scheduling request.

The determining a PUCCH resource used by the UE for transmitting the HARQ-ACK may include:

in a case where a higher layer reserves a PUCCH resource for each base station,
determining the PUCCH resource reserved for each base station as the PUCCH resource used by the UE for transmitting the HARQ-ACK; or determining the PUCCH resource reserved for the base station as the PUCCH resource used by the UE for transmitting the HARQ-ACK; or
in a case where a higher layer reserves a PUCCH resource for all base stations, determining the reserved PUCCH resource as the PUCCH resource used by the UE for transmitting the HARQ-ACK.

The PUCCH resource is a resource semi-statically reserved by the base station for the user equipment, and the base station transmits information indicating the semi-statically reserved PUCCH resource to another base station through an X2 interface.

With reference to the description in step 103, the higher layer may reserve a PUCCH resource for each base station; or the higher layer may also reserve a PUCCH resource for all base stations. However, for different base stations, cyclic shifts of reference signals in the reserved PUCCH resource may be different to distinguish the difference of base stations that use the PUCCH resource to transmit data. The reserved information may be stored in each base station, or may also be stored in a base station and transmitted between base stations through an X2 interface between the base stations.

In the method for transmitting a HARQ-ACK shown in FIG. 2, a base station determines a channel used by a UE for transmitting a HARQ-ACK, determines the number of bits and transmission time of the HARQ-ACK, and detects the HARQ-ACK on the channel according to the number of bits and the transmission time. Therefore, a base station can detect the HARQ-ACK.

Figure 3:
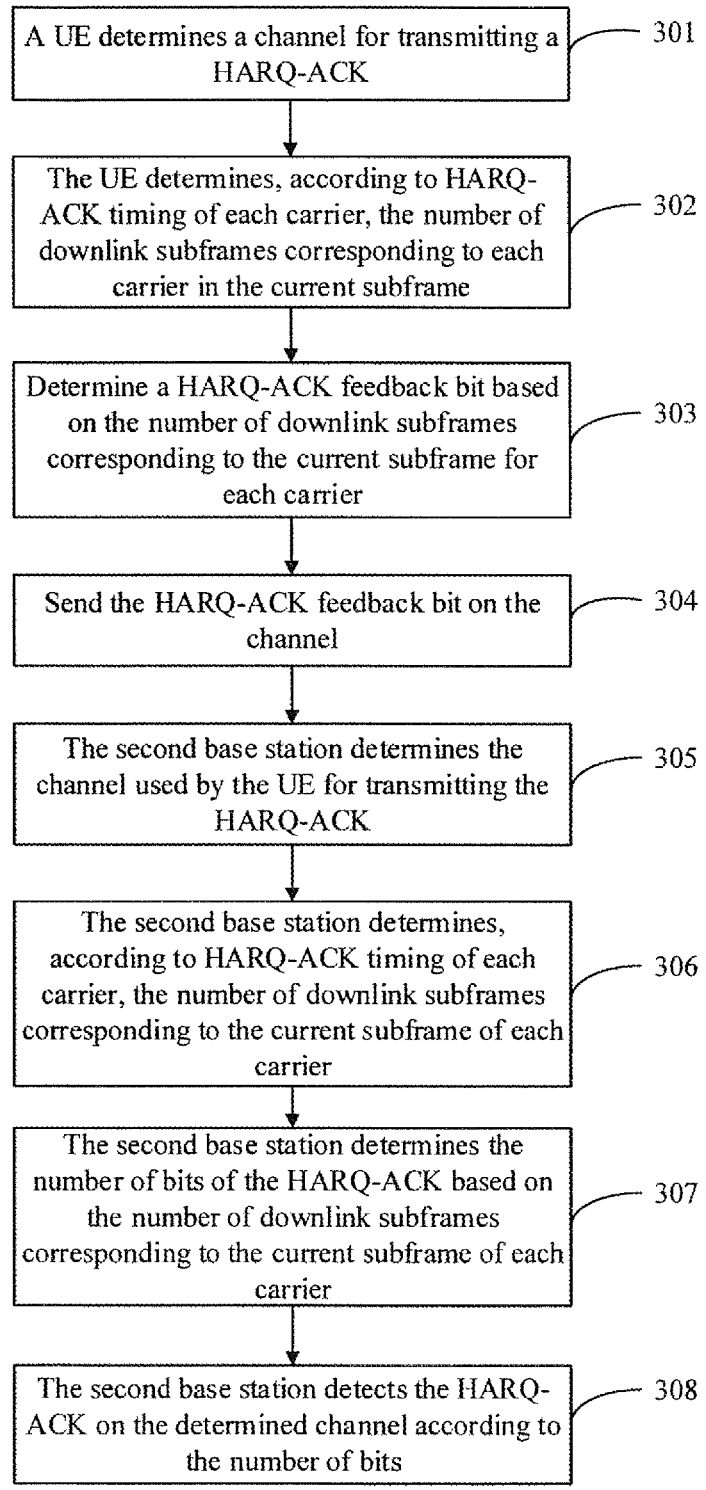
FIG. 3 is a flowchart of a third embodiment of a method for transmitting a HARQ-ACK according to the present disclosure.

FIG. 3 is a flowchart of another embodiment of a method for transmitting a HARQ-ACK according to the present disclosure. This embodiment is described with reference to a specific application instance.

The embodiment shown in FIG. 3 is applicable to a scenario where carrier aggregation is performed between two base stations having a non-ideal backhaul. In this embodiment, the two base stations are respectively described as a first base station and a second base station. The two base stations may be both macro base stations or both micro base stations, or, one is a macro base station and the other is a micro base station, which is not limited herein.

As shown in FIG. 3, the method for transmitting a HARQ-ACK in the embodiment of the present disclosure includes:

Step 301: A UE determines a channel for transmitting a HARQ-ACK.

The implementation of this step may include:

1. when the UE is configured to support simultaneous transmission of a PUSCH and a PUCCH, determining that the channel for transmitting the HARQ-ACK is a PUCCH;

2. when the UE is not configured to support simultaneous transmission of a PUSCH and a PUCCH, and no PUSCH is transmitted in a current subframe, determining that the channel for transmitting the HARQ-ACK is a PUCCH; and/or 3. when the UE is not configured to support simultaneous transmission of a PUSCH and a PUCCH, and a PUSCH is transmitted in the current subframe, determining, according to whether the UE detects that a PDSCH and/or a PDCCH is transmitted in downlink carriers corresponding to the first base station and second base station and whether PUSCHs are transmitted in uplink carriers corresponding to the first base station and second base station, the channel for transmitting the HARQ-ACK.

The related description about the implementation of the above step is given in step 101, and is not further described herein. Here the case described in 3 is described in more detail.

Preferably, the determining, according to whether the UE detects that a PDSCH and/or a PDCCH indicating semi-persistent scheduling release is transmitted in downlink carriers corresponding to the first base station and second base station and whether PUSCHs are transmitted in uplink carriers corresponding to the first base station and second base station, the channel for transmitting the HARQ-ACK may include:

3.1. When the UE only detects that a PDSCH and/or a PDCCH indicating semi-persistent scheduling release is transmitted in a downlink carrier corresponding to the first base station, and a PUSCH is transmitted in an uplink carrier corresponding to the first base station in the current subframe, determine that the channel for transmitting the HARQ-ACK is the PUSCH transmitted in the uplink carrier corresponding to the first base station.

3.2. When the UE only detects that a PDSCH and/or a PDCCH indicating semi-persistent scheduling release is transmitted in a downlink carrier corresponding to the second base station, and a PUSCH is transmitted in an uplink carrier corresponding to the second base station in the current subframe, determine that the channel for transmitting the HARQ-ACK is the PUSCH transmitted in the uplink carrier corresponding to the second base station.

3.3. When the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and PUSCHs are transmitted in uplink carriers corresponding to both the first base station and the second base station in the current subframe, determine, according to a first preset manner, the channel for transmitting the HARQ-ACK.

The determining, according to a first preset manner, the channel for transmitting the HARQ-ACK may include:
  determining that the channel for transmitting the HARQ-ACK is a PUSCH transmitted in an uplink carrier corresponding to the first base station; or
  determining that the channel for transmitting the HARQ-ACK is a PUSCH transmitted in an uplink carrier corresponding to the second base station; or
  determining that the channel for transmitting the HARQ-ACK is a PUCCH, in which case, all PUSCHs transmitted in the uplink carriers corresponding to the first base station and the second base station may be discarded; or
  determining that the channel for transmitting the HARQ-ACK is a PUSCH transmitted in an uplink carrier corresponding to the first base station and a PUSCH transmitted in an uplink carrier corresponding to the second base station; or
  determining, according to a preset priority condition, the channel for transmitting the HARQ-ACK.

The preset priority condition may be: a HARQ-ACK transmission priority of each base station; and therefore, the determining, according to a preset priority condition, the channel for transmitting the HARQ-ACK may include:
  determining, according to the HARQ-ACK transmission priority of each base station, that the channel for transmitting the HARQ-ACK is a PUSCH transmitted in an uplink carrier corresponding to a base station of a higher transmission priority.

For example, when the priority condition is preset, the HARQ-ACK transmission priority of the first base station may be preset to be higher than the HARQ-ACK transmission priority of the second base station, for example, the HARQ-ACK transmission priority of the first base station is set to be high, and the HARQ-ACK transmission priority of the second base station is set to be low, then the channel for transmitting the HARQ-ACK may be determined as: the PUSCH transmitted in the uplink carrier corresponding to the first base station.

Alternatively, the preset priority condition may be: a priority of a PUSCH transmitted in an uplink carrier corresponding to each base station; and therefore, the determining, according to a preset priority condition, the channel for transmitting the HARQ-ACK includes:
  determining, according to the priorities of PUSCHs, that the channel for transmitting the HARQ-ACK is a PUSCH of a higher priority.

For example, when the priority condition is preset, the priority of the PUSCH transmitted in the uplink carrier corresponding to the first base station may be set to be higher than the priority of the PUSCH transmitted in the uplink carrier corresponding to the second base station, for example, the priority of the PUSCH transmitted in the uplink carrier corresponding to the first base station is set to be high, and the priority of the PUSCH transmitted in the uplink carrier corresponding to the second base station is set to be low, then the channel for transmitting the HARQ-ACK may be determined as: the PUSCH transmitted in the uplink carrier corresponding to the first base station.

3.4. When the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and a PUSCH is transmitted in an uplink carrier corresponding to only the first base station or the second base station in the current subframe, determine, according to a second preset manner, the channel for transmitting the HARQ-ACK.

The determining, according to a second preset manner, the channel for transmitting the HARQ-ACK may include:
  when a PUSCH is transmitted in an uplink carrier corresponding to only the first base station in the current subframe, determining that the channel for transmitting the HARQ-ACK is the PUSCH transmitted in the uplink carrier corresponding to the first base station; when a PUSCH is transmitted in an uplink carrier corresponding to only the second base station in the current subframe, determining that the channel for transmitting the HARQ-ACK is the PUSCH transmitted in the uplink carrier corresponding to the second base station; or
  determining that the channel for transmitting the HARQ-ACK is a PUCCH, in which case, all PUSCHs transmitted in the uplink carrier corresponding to the first base station or the second base station may be discarded.

3.5. When the UE only detects that a PDSCH and/or a PDCCH indicating semi-persistent scheduling release is transmitted in a downlink carrier corresponding to the first base station, and a PUSCH is transmitted in an uplink carrier corresponding to only the second base station in the current subframe, determine that the channel for transmitting the HARQ-ACK is a PUCCH.

In this case, the PUSCH transmitted in the uplink carrier corresponding to the second base station is discarded.

3.6. When the UE only detects that a PDSCH and/or a PDCCH indicating semi-persistent scheduling release is transmitted in a downlink carrier corresponding to the second base station, and a PUSCH is transmitted in an uplink carrier corresponding to only the first base station in the current subframe, determine that the channel for transmitting the HARQ-ACK is a PUCCH;

In this case, the PUSCH transmitted in the uplink carrier corresponding to the first base station is discarded.

Step 302: The UE determines, according to HARQ-ACK timing of each carrier, the number of downlink subframes corresponding to the current subframe for each carrier.

Step 303: Determine a HARQ-ACK feedback bit based on the number of downlink subframes corresponding to the current subframe for each carrier.

When it is determined, in step 301, that the channel for transmitting the HARQ-ACK is a PUCCH, the HARQ-ACK feedback bit may be determined based on the number of carriers configured for the UE, a transmission mode of each carrier, and the number of downlink subframes corresponding to the current subframe for each carrier; and when it is determined, in step 301, that the channel for transmitting the HARQ-ACK is a PUSCH, the HARQ-ACK feedback bit may be determined based on a first configured carrier set, a transmission mode of each carrier in the first configured carrier set, and the number of downlink subframes corresponding to the current subframe for each carrier, where the first configured carrier set includes all downlink carriers corresponding to the PUSCH in downlink carriers configured for the UE, where the downlink carriers corresponding to the PUSCH are downlink carriers corresponding to a base station corresponding to the PUSCH.

Step 304: Send the HARQ-ACK feedback bit on the channel.

Preferably, when the determined channel for transmitting the HARQ-ACK in step 301 is a PUCCH, the sending the HARQ-ACK feedback bit on the channel may include:

determining a PUCCH resource for transmitting the HARQ-ACK; and sending the HARQ-ACK feedback bit by using the PUCCH resource.

When a channel format of the PUCCH is format 3, and when the current subframe is configured to transmit a scheduling request, the determining a PUCCH resource for transmitting the HARQ-ACK may include:

reserving a PUCCH resource for the first base station and the second base station respectively; and determining, according to a base station corresponding to the scheduling request that the current subframe is configured to transmit, the PUCCH resource reserved for the base station as the PUCCH resource for transmitting the HARQ-ACK; or reserving a PUCCH resource; determining a PUCCH resource index, and obtaining a sequence index of an orthogonal sequence of the PUCCH according to the resource index; determining, according to the sequence index, a cyclic shift of a reference signal; and determining the reserved PUCCH resource that uses the cyclic shift, as the PUCCH resource for transmitting the HARQ-ACK.

The determining, according to the sequence index, a cyclic shift of a reference signal may include:

presetting a cyclic shift of a sequence index corresponding to each base station; and determining, according to a base station corresponding to the scheduling request that the current subframe is configured to transmit, the cyclic shift of the reference signal as a cyclic shift of the sequence index corresponding to the base station.

When a channel format of the PUCCH is format 1b, and when the current subframe is configured to transmit a scheduling request, the determining a PUCCH resource for transmitting the HARQ-ACK includes:

reserving a PUCCH resource for the first base station and the second base station respectively; and determining, according to a base station corresponding to the scheduling request that the subframe transmitting the acknowledgement information is configured to transmit, the PUCCH resource reserved for the base station as the PUCCH resource for transmitting the HARQ-ACK.

How the UE sends, at the transmission time, the HARQ-ACK by using the PUCCH resource is not further described herein.

When the UE determines, in step 301, that the channel for transmitting the HARQ-ACK is a PUSCH, the transmission at the transmission time may be implemented with reference to the method described in an existing standard and is not further described herein.

Step 305: The second base station determines the channel used by the UE for transmitting the HARQ-ACK.

Preferably, the determining, by the second base station, the channel used by the UE for transmitting the HARQ-ACK may include:

when the UE is configured to support simultaneous transmission of a PUSCH and a PUCCH, determining, by the second base station, that the channel used by the UE for transmitting the HARQ-ACK is a PUCCH;

when the UE is not configured to support simultaneous transmission of a PUSCH and a PUCCH, and no PUSCH is transmitted in the current subframe, determining, by the second base station, that the channel used by the UE for transmitting the HARQ-ACK is a PUCCH; and/or when the UE is not configured to support simultaneous transmission of a PUSCH and a PUCCH, and a PUSCH is transmitted in the current subframe, determining, by the second base station, that the channel used by the UE for transmitting the HARQ-ACK is a PUCCH and a PUSCH in the uplink carrier corresponding to the second base station, and that the PUCCH has a higher priority than the PUSCH.

Step 306: The second base station determines, according to HARQ-ACK timing of each carrier, the number of downlink subframes corresponding to the current subframe for each carrier.

Step 307: The second base station determines the number of bits of the HARQ-ACK based on the number of downlink subframes corresponding to the current subframe for each carrier.

Preferably, the determining, by the second base station, the number of bits of the HARQ-ACK based on the number of downlink subframes corresponding to the current subframe for each carrier may include:

when the second base station determines in step 305 that the channel used by the UE for transmitting the HARQ-ACK is a PUCCH, determining the number of bits of the HARQ-ACK based on the number of carriers configured for the UE, the transmission mode of each carrier, and the number of downlink subframes corresponding to the current subframe for each carrier; and when the second base station determines in step 305 that the channel used by the UE for transmitting the HARQ-ACK is a PUSCH, determining the number of bits of the HARQ-ACK based on a second configured carrier set, a transmission mode of each carrier in the second configured carrier set, and the number of downlink subframes corresponding to the current subframe for each carrier, where the second configured carrier set includes all downlink carriers configured by the second base station for the UE.

Step 308: The second base station detects the HARQ-ACK on the determined channel according to the number of bits.

When the channel determined by the second base station in step 305 is a PUCCH, the second base station detects the HARQ-ACK on the PUCCH in this step.

When the channel determined by the second base station in step 305 is a PUCCH and a PUSCH in the uplink carrier corresponding to the second base station, the detecting the HARQ-ACK on the determined channel may include:

first detecting the HARQ-ACK on the PUCCH; and when the HARQ-ACK is not detected on the PUCCH, detecting the HARQ-ACK on the PUSCH.

The detecting the HARQ-ACK on the PUCCH may include:
  determining a PUCCH resource used by the UE for transmitting the HARQ-ACK; and
  detecting the HARQ-ACK on the PUCCH resource.

The determining a PUCCH resource used by the UE for transmitting the HARQ-ACK includes:
  in a case where a PUCCH resource is reserved for the first base station and the second base station respectively, determining the PUCCH resource reserved for the first base station and the second base station as the PUCCH resource used by the UE for transmitting the HARQ-ACK; or determining the PUCCH resource reserved for the second base station as the PUCCH resource used by the UE for transmitting the HARQ-ACK;
  or, in a case where a PUCCH resource is reserved for the first base station and the second base station jointly, determining the PUCCH resource jointly reserved for the first base station and the second base station as the PUCCH resource used by the UE for transmitting the HARQ-ACK.

The PUCCH resource reserved for each base station may be stored in each base station, or may also be stored in a base station and transmitted between base stations through an X2 interface between the base stations.

The process of detecting the HARQ-ACK by the first base station is the same as the process of detecting the HARQ-ACK by the second base station in step 305 to step 308 in the embodiment of the present disclosure, and is not further described herein.

In the method for transmitting a HARQ-ACK shown in FIG. 3, transmission of the HARQ-ACK between the UE and the base station is implemented through the cooperation between the UE and the base station.

Figure 3A:
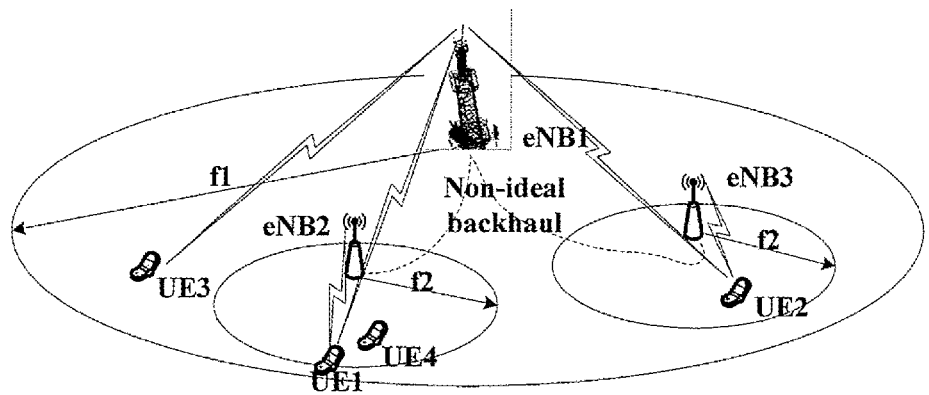
FIG. 3A is a diagram of a scenario where carrier aggregation is performed between base stations having a non-ideal backhaul.

More specifically, the embodiment shown in FIG. 3 may be applied to a scenario where cells corresponding to a macro base station and a micro base station are coupled in FIG. 3A. The macro base station eNB1 deployed at frequency f1 mainly provides system information, radio link monitoring, and mobility management to ensure continuity of services; in addition, the macro base station also provides a semi-persistent scheduling service to ensure continuity of the voice service. The macro base station eNB1 includes multiple micro base stations within its coverage, for example, micro base stations eNB2 and eNB3, where the micro base stations are deployed at frequency f2 and mainly provide transmission of a high data rate service. A non-ideal backhaul exists between the macro base station and each micro base station and between two micro base stations. In this case, the first base station in this embodiment may be the macro base station shown in FIG. 3A, and the second base station may be any micro base station shown in FIG. 3A. In this case, so long as the second base station has a capability of receiving the PUCCH sent in the uplink carrier corresponding to the macro base station,
  if the UE determines, in step 301, that a HARQ-ACK is sent in an uplink primary carrier corresponding to the first base station through a PUCCH, the second base station may directly receive, on the PUCCH of the uplink primary carrier corresponding to the first base station, the HARQ-ACK sent by the UE, without requiring the first base station to forward the HARQ-ACK to the second base station after the first base station receives the HARQ-ACK, which shortens the time of receiving the HARQ-ACK by the second base station and further shortens the time of performing downlink data scheduling by the second base station for the UE.

In addition, in a case where a PUSCH is transmitted in the current subframe, the UE may further directly determine to send the HARQ-ACK through the PUSCH in the uplink carrier corresponding to the second base station. In this case, the UE directly sends the HARQ-ACK to the second base station, without requiring the first base station to forward the acknowledgement information to the second base station, which can also shorten the time of receiving the HARQ-ACK by the second base station and further shorten the time of performing downlink data scheduling by the second base station for the UE.

Corresponding to the above methods, an embodiment of the present disclosure further provides an apparatus for transmitting a HARQ-ACK.

Figure 4:
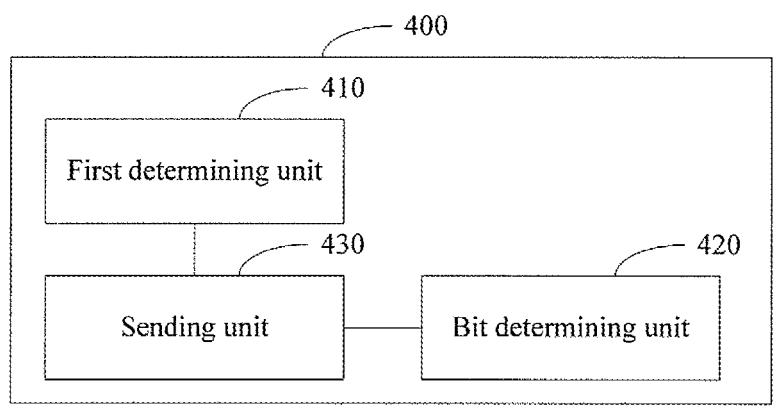
FIG. 4 is a structural diagram of a first embodiment of an apparatus for transmitting a HARQ-ACK according to the present disclosure.

FIG. 4 shows a first embodiment of an apparatus for transmitting a HARQ-ACK according to the present disclosure. The transmission apparatus may be disposed in a UE, and the transmission apparatus 400 includes:
  a first determining unit 410, configured to determine a channel for transmitting a HARQ-ACK;
  a bit determining unit 420, configured to determine a HARQ-ACK feedback bit; and
  a sending unit 430, configured to send the HARQ-ACK feedback bit determined by the bit determining unit 420 on the channel determined by the first determining unit 410.

Preferably, the first determining unit 410 may include:
  a first determining subunit, configured to: when the UE is configured to support simultaneous transmission of a PUSCH and a PUCCH, determine that the channel for transmitting the HARQ-ACK is a PUCCH;
  a second determining subunit, configured to: when the UE is not configured to support simultaneous transmission of a PUSCH and a PUCCH, and no PUSCH is transmitted in a current subframe, determine that the channel for transmitting the HARQ-ACK is a PUCCH; and/or
  a third determining subunit, configured to: when the UE is not configured to support simultaneous transmission of a PUSCH and a PUCCH, and a PUSCH is transmitted in the current subframe, determine, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK,
  where the current subframe is a subframe for transmitting the HARQ-ACK.

Preferably, the base stations may include a first base station and a second base station; in this case,
  the third determining subunit may be specifically configured to: when the UE is not configured to support simultaneous transmission of a PUSCH and a PUCCH, and a PUSCH is transmitted in the current subframe,
  when the UE only detects that a PDSCH and/or a PDCCH indicating semi-persistent scheduling release is transmitted in a downlink carrier corresponding to the first base station, and a PUSCH is transmitted in an uplink carrier corresponding to the first base station in the current subframe, determine that the channel for transmitting the HARQ-ACK is the PUSCH transmitted in the uplink carrier corresponding to the first base station;

when the UE only detects that a PDSCH and/or a PDCCH indicating semi-persistent scheduling release is transmitted in a downlink carrier corresponding to the second base station, and a PUSCH is transmitted in an uplink carrier corresponding to the second base station in the current subframe, determine that the channel for transmitting the HARQ-ACK is the PUSCH transmitted in the uplink carrier corresponding to the second base station;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and PUSCHs are transmitted in uplink carriers corresponding to both the first base station and the second base station in the current subframe, determine, according to a first preset manner, the channel for transmitting the HARQ-ACK;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and a PUSCH is transmitted in an uplink carrier corresponding to only the first base station or the second base station in the current subframe, determine, according to a second preset manner, the channel for transmitting the HARQ-ACK;

when the UE only detects that a PDSCH and/or a PDCCH indicating semi-persistent scheduling release is transmitted in a downlink carrier corresponding to the first base station, and a PUSCH is transmitted in an uplink carrier corresponding to only the second base station in the current subframe, determine that the channel for transmitting the HARQ-ACK is a PUCCH; and/or when the UE only detects that a PDSCH and/or a PDCCH indicating semi-persistent scheduling release is transmitted in a downlink carrier corresponding to the second base station, and a PUSCH is transmitted in an uplink carrier corresponding to only the first base station in the current subframe, determine that the channel for transmitting the HARQ-ACK is a PUCCH.

Preferably, the third determining subunit may be specifically configured to implement, in the following manners, the determining, according to a first preset manner, the channel for transmitting the HARQ-ACK:

determining that the channel for transmitting the HARQ-ACK is a PUSCH transmitted in an uplink carrier corresponding to the first base station; or determining that the channel for transmitting the HARQ-ACK is a PUSCH transmitted in an uplink carrier corresponding to the second base station; or determining that the channel for transmitting the HARQ-ACK is a PUCCH; or determining that the channel for transmitting the HARQ-ACK is a PUSCH transmitted in an uplink carrier corresponding to the first base station and a PUSCH transmitted in an uplink carrier corresponding to the second base station; or determining, according to a preset priority condition, the channel for transmitting the HARQ-ACK.

Preferably, the preset priority condition is a HARQ-ACK transmission priority of each base station; and therefore, the third determining subunit is specifically configured to implement, in the following manners, the determining, according to a preset priority condition, the channel for transmitting the HARQ-ACK:

determining, according to the HARQ-ACK transmission priority of each base station, that the channel for transmitting the HARQ-ACK is a PUSCH transmitted in an uplink carrier corresponding to a base station of a higher transmission priority;

or, the preset priority condition is a priority of a PUSCH transmitted in a carrier corresponding to each base station; and therefore, the determining, according to a preset priority condition, the channel for transmitting the HARQ-ACK includes:

determining, according to the priorities of PUSCHs, that the channel for transmitting the HARQ-ACK is a PUSCH of a higher priority.

Preferably, the third determining subunit may be specifically configured to implement, in the following manners, the determining, according to a second preset manner, the channel for transmitting the HARQ-ACK:

when a PUSCH is transmitted in an uplink carrier corresponding to only the first base station in the current subframe, determining that the channel for transmitting the HARQ-ACK is the PUSCH transmitted in the uplink carrier corresponding to the first base station; when a PUSCH is transmitted in an uplink carrier corresponding to only the second base station in the current subframe, determining that the channel for transmitting the HARQ-ACK is the PUSCH transmitted in the uplink carrier corresponding to the second base station; or determining that the channel for transmitting the HARQ-ACK is a PUCCH.

Preferably, the first base station is a macro base station, and the second base station is a micro base station.

Figure 4A:
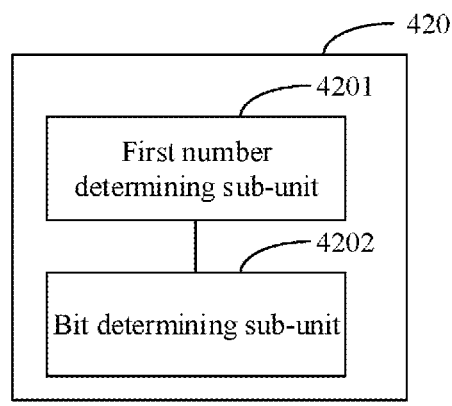
FIG. 4a is a structural diagram of a unit in an apparatus for transmitting a HARQ-ACK according to the present disclosure.

Preferably, referring to FIG. 4a, the bit determining unit 420 may include:

a first number determining subunit 4201, configured to determine, according to HARQ-ACK timing of each carrier, the number of downlink subframes corresponding to the current subframe for each carrier; and a bit determining subunit 4202, configured to determine the HARQ-ACK feedback bit based on the number of downlink subframes determined by the first number determining subunit.

Preferably, the bit determining subunit 4202 may be specifically configured to:

when it is determined that the channel for transmitting the HARQ-ACK is a PUCCH, determine the HARQ-ACK feedback bit based on the number of carriers configured for the UE, a transmission mode of each carrier, and the number of downlink subframes corresponding to the current subframe for each carrier; and when it is determined that the channel for transmitting the HARQ-ACK is a PUSCH, determine the HARQ-ACK feedback bit based on a first configured carrier set, a transmission mode of each carrier in the first configured carrier set, and the number of downlink subframes corresponding to the current subframe for each carrier, where the first configured carrier set includes all downlink carriers corresponding to the PUSCH in downlink carriers configured for the UE, where the downlink carriers corresponding to the PUSCH are downlink carriers corresponding to a base station corresponding to the PUSCH.

Figure 4B:
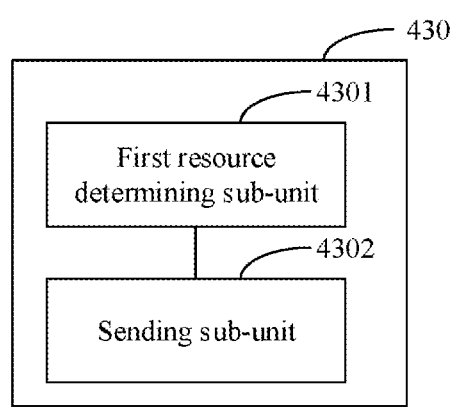
FIG. 4b is a structural diagram of another unit in an apparatus for transmitting a HARQ-ACK according to the present disclosure.

Preferably, when it is determined that the channel for transmitting the HARQ-ACK is a PUCCH, referring to FIG. 4b, the sending unit 430 may include:
- a first resource determining subunit 4301, configured to determine a PUCCH resource for transmitting the HARQ-ACK; and
- a sending subunit 4302, configured to send the HARQ-ACK feedback bit by using the PUCCH resource.

Preferably, when a channel format of the PUCCH is format 3, and when the current subframe is configured to transmit a scheduling request, the first resource determining subunit 4301 may be specifically configured to:
- reserve a PUCCH resource for each base station; and determine, according to a base station corresponding to the scheduling request that the current subframe is configured to transmit, the PUCCH resource reserved for the base station as the PUCCH resource for transmitting the HARQ-ACK; or
- reserve a PUCCH resource; determine a PUCCH resource index, and obtain a sequence index of an orthogonal sequence of the PUCCH according to the resource index; determine, according to a base station corresponding to the scheduling request that the current subframe is configured to transmit, a cyclic shift of a sequence index preset for the base station as a cyclic shift of a reference signal; and determine the reserved PUCCH resource that uses the cyclic shift of the reference signal, as the PUCCH resource for transmitting the HARQ-ACK.

Preferably, when a channel format of the PUCCH is format 1b, and when the current subframe is configured to transmit a scheduling request, the first resource determining subunit 4301 may be specifically configured to:
- reserve a PUCCH resource for each base station; and determine, according to a base station corresponding to the scheduling request that the current subframe is configured to transmit, the PUCCH resource reserved for the base station as the PUCCH resource for transmitting the HARQ-ACK.

In the apparatus for transmitting a HARQ-ACK shown in FIG. 4, a channel for transmitting a HARQ-ACK is determined and a HARQ-ACK feedback bit are determined, and the HARQ-ACK feedback bit are sent on the channel, so that a UE can send the HARQ-ACK to a base station.

Figure 5:
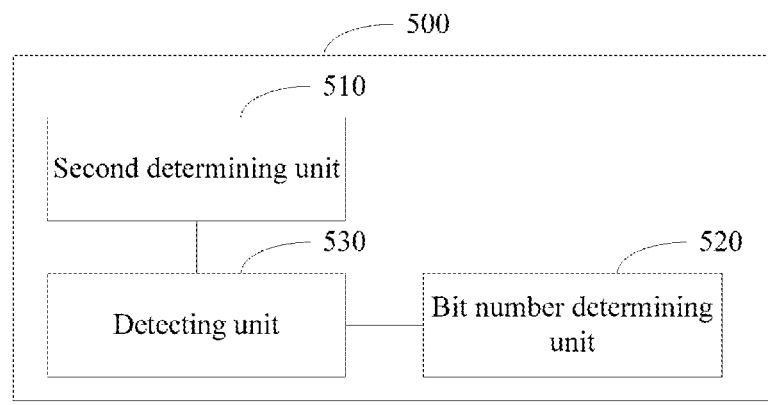
FIG. 5 is a structural diagram of a second embodiment of an apparatus for transmitting a HARQ-ACK according to the present disclosure.

FIG. 5 is a structural diagram of a second embodiment of an apparatus for transmitting a HARQ-ACK according to an embodiment of the present disclosure. The transmission apparatus may be disposed in a base station, and the transmission apparatus 500 includes:
- a second determining unit 510, configured to determine a channel used by a UE for transmitting a HARQ-ACK;
- a bit number determining unit 520, configured to determine the number of bits of the HARQ-ACK transmitted by the UE; and
- a detecting unit 530, configured to detect, according to the number of bits determined by the bit number determining unit 520, the HARQ-ACK on the channel determined by the second determining unit 510.

Preferably, the second determining unit 510 may be specifically configured to:
- when the UE is configured to support simultaneous transmission of a PUSCH and a PUCCH, determine that the channel used by the UE for transmitting the HARQ-ACK is a PUCCH;
- when the UE is not configured to support simultaneous transmission of a PUSCH and a PUCCH, and no PUSCH is transmitted in a current subframe, determine that the channel used by the UE for transmitting the HARQ-ACK is a PUCCH; and/or
- when the UE is not configured to support simultaneous transmission of a PUSCH and a PUCCH, and a PUSCH is transmitted in the current subframe, determine that the channel used by the UE for transmitting the HARQ-ACK is a PUCCH and PUSCH, and that the PUCCH has a higher priority than the PUSCH, where the current subframe is a subframe for transmitting the HARQ-ACK.

Figure 5A:
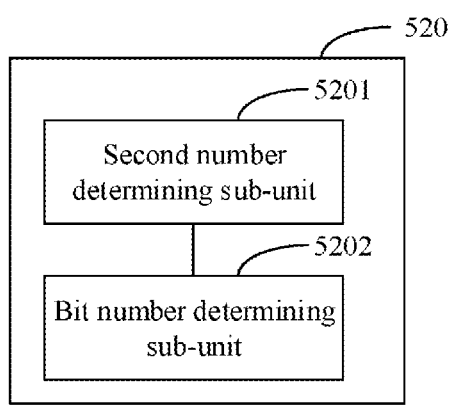
FIG. 5a is a structural diagram of a unit in an apparatus for transmitting a HARQ-ACK according to the present disclosure.

Preferably, as shown in FIG. 5a, the bit number determining unit 520 may include:
- a second number determining subunit 5201, configured to determine, according to HARQ-ACK timing of each carrier, the number of downlink subframes corresponding to the current subframe for each carrier; and
- a bit number determining subunit 5202, configured to determine the number of bits of the HARQ-ACK based on the number of downlink subframes corresponding to the current subframe for each carrier.

Preferably, the bit number determining subunit 5202 may be specifically configured to:
- when it is determined that the channel used by the UE for transmitting the HARQ-ACK is a PUCCH, determine the number of bits of the HARQ-ACK based on the number of carriers configured for the UE, a transmission mode of each carrier, and the number of downlink subframes corresponding to the current subframe for each carrier; and
- when it is determined that the channel used by the UE for transmitting the HARQ-ACK is a PUSCH, determine the number of bits of the HARQ-ACK based on a second configured carrier set, a transmission mode of each carrier in the second configured carrier set, and the number of downlink subframes corresponding to the current subframe for each carrier, where the second configured carrier set includes all downlink carriers configured by the base station for the UE.

Figure 5B:
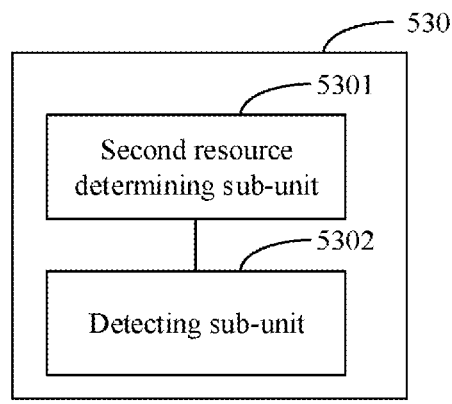
FIG. 5b is a structural diagram of another unit in an apparatus for transmitting a HARQ-ACK according to the present disclosure.

Preferably, when it is determined that the channel used by the UE for transmitting the HARQ-ACK is a PUCCH, referring to FIG. 5b, the detecting unit 530 may include:
- a second resource determining subunit 5301, configured to determine a PUCCH resource used by the UE for transmitting the HARQ-ACK; and
- a detecting subunit 5302, configured to detect the HARQ-ACK on the PUCCH resource according to the number of bits.

Preferably, the detecting subunit 5302 may be further configured to:
- detect scheduling request information on the PUCCH resource, and determine, according to the determined PUCCH resource, a base station corresponding to the scheduling request information request, where the base station corresponding to the scheduling request is a base station from which an uplink resource is requested by the scheduling request.

Preferably, the PUCCH resource is a resource semi-statically reserved by the base station for the user equipment, and the base station transmits information indicating the semi-statically reserved PUCCH resource to another base station through an X2 interface.

In the apparatus for transmitting a HARQ-ACK shown in FIG. 5, a channel used by a UE for transmitting a HARQ-ACK is determined, the number of bits and transmission time of the HARQ-ACK are determined, and the HARQ- ACK is detected on the channel according to the number of bits and the transmission time. Therefore, a base station can detect the HARQ-ACK.

Figure 6:
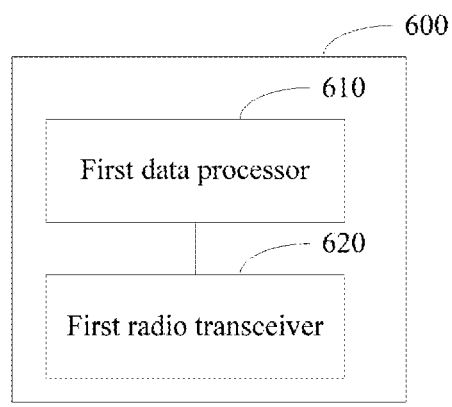
FIG. 6 is a structural diagram of an embodiment of a UE for transmitting a HARQ-ACK according to the present disclosure.

An embodiment of the present disclosure further provides a UE for transmitting a HARQ-ACK. Referring to FIG. 6, the UE 600 includes a first data processor 610 and a first radio transceiver 620, where:

the first data processor 610 is configured to determine a channel for transmitting a HARQ-ACK, and determine a HARQ-ACK feedback bit; and the first radio transceiver 620 is configured to send the HARQ-ACK feedback bit on the channel determined by the data processor.

Preferably, the first data processor 610 may be specifically configured to implement, in the following manners, the determining a channel for transmitting a HARQ-ACK:

when the UE is configured to support simultaneous transmission of a PUSCH and a PUCCH, determining that the channel for transmitting the HARQ-ACK is a PUCCH;

when the UE is not configured to support simultaneous transmission of a PUSCH and a PUCCH, and no PUSCH is transmitted in a current subframe, determining that the channel for transmitting the HARQ-ACK is a PUCCH; and/or when the UE is not configured to support simultaneous transmission of a PUSCH and a PUCCH, and a PUSCH is transmitted in the current subframe, determining, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK, where the current subframe is a subframe for transmitting the HARQ-ACK.

Preferably, the base stations include a first base station and a second base station;

the first data processor 610 may be specifically configured to implement, in the following manners, the determining, according to whether the UE detects that a PDSCH and/or a PDCCH indicating semi-persistent scheduling release is transmitted in a downlink carrier corresponding to each base station and whether a PUSCH is transmitted in an uplink carrier corresponding to each base station in the current subframe, the channel for transmitting the HARQ-ACK:

when the UE only detects that a PDSCH and/or a PDCCH indicating semi-persistent scheduling release is transmitted in a downlink carrier corresponding to the first base station, and a PUSCH is transmitted in an uplink carrier corresponding to the first base station in the current subframe, determining that the channel for transmitting the HARQ-ACK is the PUSCH transmitted in the uplink carrier corresponding to the first base station;

when the UE only detects that a PDSCH and/or a PDCCH indicating semi-persistent scheduling release is transmitted in a downlink carrier corresponding to the second base station, and a PUSCH is transmitted in an uplink carrier corresponding to the second base station in the current subframe, determining that the channel for transmitting the HARQ-ACK is the PUSCH transmitted in the uplink carrier corresponding to the second base station;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and PUSCHs are transmitted in uplink carriers corresponding to both the first base station and the second base station in the current subframe, determining, according to a first preset manner, the channel for transmitting the HARQ-ACK;

when the UE detects that a PDSCH and/or a PDCCH indicating semi-persistent scheduling release is transmitted in a downlink carrier corresponding to the first base station, and the UE detects that a PDSCH and/or a PDCCH indicating semi-persistent scheduling release is transmitted in a downlink carrier corresponding to the second base station, and a PUSCH is transmitted in an uplink carrier corresponding to only the first base station or the second base station in the current subframe, determining, according to a second preset manner, the channel for transmitting the HARQ-ACK;

when the UE only detects that a PDSCH and/or a PDCCH indicating semi-persistent scheduling release is transmitted in a downlink carrier corresponding to the first base station, and a PUSCH is transmitted in an uplink carrier corresponding to only the second base station in the current subframe, determining that the channel for transmitting the HARQ-ACK is a PUCCH; or when the UE only detects that a PDSCH and/or a PDCCH indicating semi-persistent scheduling release is transmitted in a downlink carrier corresponding to the second base station, and a PUSCH is transmitted in an uplink carrier corresponding to only the first base station in the current subframe, determining that the channel for transmitting the HARQ-ACK is a PUCCH.

Preferably, the first data processor 610 may be specifically configured to implement, in the following manners, the determining, according to a first preset manner, the channel for transmitting the HARQ-ACK:

determining that the channel for transmitting the HARQ-ACK is a PUSCH transmitted in an uplink carrier corresponding to the first base station; or determining that the channel for transmitting the HARQ-ACK is a PUSCH transmitted in an uplink carrier corresponding to the second base station; or determining that the channel for transmitting the HARQ-ACK is a PUCCH; or determining that the channel for transmitting the HARQ-ACK is a PUSCH transmitted in an uplink carrier corresponding to the first base station and a PUSCH transmitted in an uplink carrier corresponding to the second base station; or determining, according to a preset priority condition, the channel for transmitting the HARQ-ACK.

Preferably, the preset priority condition is a HARQ-ACK transmission priority of each base station; and therefore, the first data processor 610 may be specifically configured to implement, in the following manners, the determining, according to a preset priority condition, the channel for transmitting the HARQ-ACK:

determining, according to the HARQ-ACK transmission priority of each base station, that the channel for transmitting the HARQ-ACK is a PUSCH transmitted in an uplink carrier corresponding to a base station of a higher transmission priority;

or, the preset priority condition is a priority of a PUSCH transmitted in a carrier corresponding to each base station; and therefore, the determining, according to a preset priority condition, the channel for transmitting the HARQ-ACK includes:

determining, according to the priorities of PUSCHs, that the channel for transmitting the HARQ-ACK is a PUSCH of a higher priority.

Preferably, the first data processor 610 may be specifically configured to implement, in the following manners, the determining, according to a second preset manner, the channel for transmitting the HARQ-ACK:

when a PUSCH is transmitted in an uplink carrier corresponding to only the first base station in the current subframe, determining that the channel for transmitting the HARQ-ACK is the PUSCH transmitted in the uplink carrier corresponding to the first base station; when a PUSCH is transmitted in an uplink carrier corresponding to only the second base station in the current subframe, determining that the channel for transmitting the HARQ-ACK is the PUSCH transmitted in the uplink carrier corresponding to the second base station; or determining that the channel for transmitting the HARQ-ACK is a PUCCH.

Preferably, the first base station is a macro base station, and the second base station is a micro base station.

Preferably, the first data processor 610 may be specifically configured to implement, in the following manners, the determining the HARQ-ACK feedback bit:

determining, according to HARQ-ACK timing of each carrier, the number of downlink subframes corresponding to the current subframe for each carrier; and determining the HARQ-ACK feedback bit based on the number of downlink subframes corresponding to the current subframe for each carrier.

Preferably, the first data processor 610 may be specifically configured to implement, in the following manners, the determining the HARQ-ACK feedback bit based on the number of downlink subframes corresponding to the current subframe for each carrier:

when determining that the channel for transmitting the HARQ-ACK is a PUCCH, determining the HARQ-ACK feedback bit based on the number of carriers configured for the UE, a transmission mode of each carrier, and the number of downlink subframes corresponding to the current subframe for each carrier; and/or when determining that the channel for transmitting the HARQ-ACK is a PUSCH, determining the HARQ-ACK feedback bit based on a first configured carrier set, a transmission mode of each carrier in the first configured carrier set, and the number of downlink subframes corresponding to the current subframe for each carrier, where the first configured carrier set includes all downlink carriers corresponding to the PUSCH in downlink carriers configured for the UE, where the downlink carriers corresponding to the PUSCH are downlink carriers corresponding to a base station corresponding to the PUSCH.

Preferably, when it is determined that the channel for transmitting the HARQ-ACK is a PUCCH, the first radio transceiver 620 may be specifically configured to:

determine a PUCCH resource for transmitting the HARQ-ACK; and send the HARQ-ACK feedback bit by using the PUCCH resource.

Preferably, when a channel format of the PUCCH is format 3, and when the current subframe is configured to transmit a scheduling request, the first radio transceiver 620 may be specifically configured to implement, in the following manners, the determining a PUCCH resource for transmitting the HARQ-ACK:

reserving a PUCCH resource for each base station; and determining, according to a base station corresponding to the scheduling request that the current subframe is configured to transmit, the PUCCH resource reserved for the base station as the PUCCH resource for transmitting the HARQ-ACK; or reserving a PUCCH resource; determining a PUCCH resource index, and obtaining a sequence index of an orthogonal sequence of the PUCCH according to the resource index; determining, according to a base station corresponding to the scheduling request that the current subframe is configured to transmit, a cyclic shift of a sequence index preset for the base station as a cyclic shift of a reference signal; and determining the reserved PUCCH resource that uses the cyclic shift of the reference signal, as the PUCCH resource for transmitting the HARQ-ACK.

Preferably, when a channel format of the PUCCH is format 1b, and when the current subframe is configured to transmit a scheduling request, the first radio transceiver 620 may be specifically configured to implement, in the following manners, the determining a PUCCH resource for transmitting the HARQ-ACK:

reserving a PUCCH resource for each base station; and determining, according to a base station corresponding to the scheduling request that the current subframe is configured to transmit, the PUCCH resource reserved for the base station as the PUCCH resource for transmitting the HARQ-ACK.

In the UE shown in FIG. 6, the first data processor 610 determines a channel for transmitting a HARQ-ACK and determines a HARQ-ACK feedback bit; and the first radio transceiver 620 sends the HARQ-ACK feedback bit on the channel determined by the first data processor 610. Therefore, the UE can send the HARQ-ACK to a base station.

Figure 7:
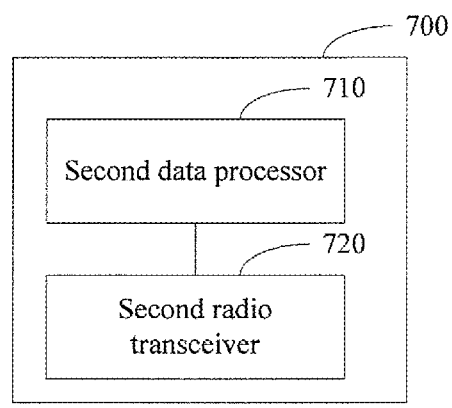
FIG. 7 is a structural diagram of an embodiment of a base station for transmitting a HARQ-ACK according to the present disclosure.

An embodiment of the present disclosure further provides a base station for transmitting a HARQ-ACK. As shown in FIG. 7, the base station 700 includes a second data processor 710 and a second radio transceiver 720, where:

the second data processor 710 is configured to determine a channel used by a UE for transmitting a HARQ-ACK, and determine the number of bits of the HARQ-ACK transmitted by the UE; and the second radio transceiver 720 is configured to detect the HARQ-ACK on the channel according to the number of bits.

Preferably, the second data processor 710 may be specifically configured to implement, in the following manners, the determining a channel used by a UE for transmitting a HARQ-ACK:

when the UE is configured to support simultaneous transmission of a PUSCH and a PUCCH, determining that the channel used by the UE for transmitting the HARQ-ACK is a PUCCH;

when the UE is not configured to support simultaneous transmission of a PUSCH and a PUCCH, and no PUSCH is transmitted in a current subframe, determining that the channel used by the UE for transmitting the HARQ-ACK is a PUCCH; and/or when the UE is not configured to support simultaneous transmission of a PUSCH and a PUCCH, and a PUSCH is transmitted in the current subframe, determining that the channel used by the UE for transmitting the HARQ-ACK is a PUCCH and PUSCH, and that the PUCCH has a higher priority than the PUSCH,
where the current subframe is a subframe for transmitting the HARQ-ACK.

Preferably, the second data processor 710 may be specifically configured to implement, in the following manners, the determining the number of bits of the HARQ-ACK transmitted by the UE:
determining, according to HARQ-ACK timing of each carrier, the number of downlink subframes corresponding to the current subframe for each carrier; and
determining the number of bits of the HARQ-ACK based on the number of downlink subframes corresponding to the current subframe for each carrier.

Preferably, the second data processor 710 may be specifically configured to implement, in the following manners, the determining the number of bits of the HARQ-ACK based on the number of downlink subframes corresponding to the current subframe for each carrier:
when determining that the channel used by the UE for transmitting the HARQ-ACK is a PUCCH, determining the number of bits of the HARQ-ACK based on the number of carriers configured for the UE, a transmission mode of each carrier, and the number of downlink subframes corresponding to the current subframe for each carrier; and
when determining that the channel used by the UE for transmitting the HARQ-ACK is a PUSCH, determining the number of bits of the HARQ-ACK based on a second configured carrier set, a transmission mode of each carrier in the second configured carrier set, and the number of downlink subframes corresponding to the current subframe for each carrier, where the second configured carrier set includes all downlink carriers configured by the base station for the UE.

Preferably, when it is determined that the channel used by the UE for transmitting the HARQ-ACK is a PUCCH, the second radio transceiver 720 may be specifically configured to:
determine a PUCCH resource used by the UE for transmitting the HARQ-ACK; and
detect the HARQ-ACK on the PUCCH resource according to the number of bits.

Preferably, the second radio transceiver 720 may be further configured to detect scheduling request information on the PUCCH resource, and determine, according to the determined PUCCH resource, a base station corresponding to the scheduling request information request, where the base station corresponding to the scheduling request is a base station from which an uplink resource is requested by the scheduling request.

Preferably, the PUCCH resource is a resource semi-statically reserved by the base station for the user equipment, and the base station transmits information indicating the semi-statically reserved PUCCH resource to another base station through an X2 interface.

In the base station shown in FIG. 7, the second data processor 710 determines a channel used by a UE for transmitting a HARQ-ACK, and determines the number of bits of the HARQ-ACK transmitted by the UE; and the second radio transceiver 720 detects the HARQ-ACK on the channel according to the number of bits. Therefore, a base station can detect the HARQ-ACK.

A person skilled in the art may clearly understand that, the technique in the embodiments of the present disclosure may be implemented through software and a necessary general hardware platform. Based on such an understanding, the technical solutions in the embodiments of the present disclosure essentially, or the part contributing to the prior art may be implemented in the form of a software product. The computer software product is stored in a storage medium, such as a ROM/RAM, a magnetic disk, or an optical disc, and includes several instructions for instructing a computer device (which may be a personal computer, a server, or a network device or the like) to perform the methods described in the embodiments of the present disclosure or in some parts of the embodiments of the present disclosure.

The embodiments in this specification are all described in a progressive manner, mutual reference may be made to the same or similar part of the embodiments, and each embodiment focuses on describing difference from other embodiments. In particular, for the system embodiment, since it is basically similar to the method embodiment, the apparatus embodiment is described simply, and the relevant part may be obtained with reference to the part of the description of the method embodiment.

The foregoing embodiments of the present disclosure are not intended to limit the protection scope of the present disclosure. Any modification, equivalent replacement, or improvement made within the spirit and principle of the present disclosure shall fall within the protection scope of the present disclosure.

What is claimed is:
1. A method comprising:
sending, by a network device, a physical downlink shared channel (PDSCH) or a physical downlink control channel (PDCCH) indicating semi-persistent scheduling release in a downlink subframe on at least one carrier of multiple carriers configured for a user equipment (UE), wherein an index of the downlink subframe is n, wherein n is an integer;
determining, by the network device, that a channel for transmitting a hybrid automatic repeat request-acknowledgement (HARQ-ACK) in response to the PDSCH or the PDCCH is a physical uplink control channel (PUCCH) in an uplink subframe on a primary carrier of the multiple carriers configured for the UE in a carrier aggregation scenario, wherein the multiple carriers configured for the UE comprise at least one carrier using frequency division duplex (FDD) and at least one carrier using time division duplex (TDD), wherein an index of the uplink subframe is (n+4);
determining, by the network device, HARQ-ACK feedback bits based on a quantity of the multiple carriers configured for the UE, a transmission mode of each carrier in the multiple carriers configured for the UE, and a quantity of downlink subframes corresponding to the uplink subframe, wherein:
the downlink subframes are downlink ones in subframes that are corresponding to the uplink subframe and are on the multiple carriers either using TDD manner or using FDD manner,
the subframes that are corresponding to the uplink subframe are subframes whose indices are n on the multiple carriers, and the subframes whose indices are n correspond to the uplink subframe having index (n+4), and
for each carrier of the multiple carriers, either using the TDD manner or using the FDD manner, when, in the downlink subframes, the PDSCH is sent or the PDCCH indicating semi-persistent scheduling release is sent, a HARQ-ACK corresponding to the PDSCH or the PDCCH is received in the uplink subframe; and detecting, by the network device, the HARQ-ACK feedback bits on the PUCCH in the uplink subframe.

2. The method according to claim 1, wherein:
when the UE is configured to support simultaneous transmission of a physical uplink shared channel (PUSCH) and a physical uplink control channel (PUCCH), the channel for transmitting the HARQ-ACK is a PUCCH.

3. The method according to claim 1, wherein:
when the UE is not configured to support simultaneous transmission of a physical uplink shared channel (PUSCH) and a physical uplink control channel (PUCCH), and no PUSCH is transmitted in the uplink subframe, the channel for transmitting the HARQ-ACK is a PUCCH.

4. A network device comprising:
a transmitter, configured to send a physical downlink shared channel (PDSCH) or a physical downlink control channel (PDCCH) indicating semi-persistent scheduling release in a downlink subframe on at least one carrier of multiple carriers configured for a user equipment (UE), wherein an index of the downlink subframe is n, wherein n is an integer;
a processor, configured to:
  determine that a channel for transmitting a hybrid automatic repeat request-acknowledgement (HARQ-ACK) in response to the PDSCH or the PDCCH is a physical uplink control channel (PUCCH) in an uplink subframe on a primary carrier of the multiple carriers configured for the UE in a carrier aggregation scenario, wherein an index of the uplink subframe is (n+4), wherein at least one carrier of the multiple carriers configured for the UE uses a frequency division duplex (FDD) manner and at least one carrier of the multiple carriers uses a time division duplex (TDD) manner;
  determine HARQ-ACK feedback bits based on a quantity of the multiple carriers configured for the UE, a transmission mode of each carrier in the multiple carriers configured for the UE, and a quantity of downlink subframes corresponding to the uplink subframe; and
a receiver, configured to receive the HARQ-ACK feedback bits on the PUCCH in the uplink subframe;
wherein:
  the downlink subframes are downlink ones in subframes that are corresponding to the uplink subframe and are on the multiple carriers either using TDD manner or using FDD manner,
  the subframes that are corresponding to the uplink subframe are subframes whose indices are n on the multiple carriers, and the subframes whose indices are n correspond to the uplink subframe having index (n+4), and
  for each carrier of the multiple carriers, either using the TDD manner or the FDD manner, and when, in the downlink subframes, the PDSCH is sent or the PDCCH indicating semi-persistent scheduling release is sent, a HARQ-ACK corresponding to the PDSCH or the PDCCH is received in the uplink subframe.

5. The network device according to claim 4, wherein:
when the UE is configured to support simultaneous transmission of a physical uplink shared channel (PUSCH) and a physical uplink control channel (PUCCH), the channel for transmitting the HARQ-ACK is a PUCCH.

6. The network device according to claim 4, wherein:
when the UE is not configured to support simultaneous transmission of a physical uplink shared channel (PUSCH) and a physical uplink control channel (PUCCH), and no PUSCH is transmitted in the uplink subframe, the channel for transmitting the HARQ-ACK is a PUCCH.

7. An apparatus in a network device, the apparatus comprising:
a storage medium including executable instructions; and
a processor;
wherein the executable instructions, when executed by the processor, cause the apparatus to:
  send a physical downlink shared channel (PDSCH) or a physical downlink control channel (PDCCH) indicating semi-persistent scheduling release in a downlink subframe on at least one carrier of multiple carriers configured for a user equipment (UE), wherein an index of the downlink subframe is n, wherein n is an integer;
  determine that a channel for transmitting a hybrid automatic repeat request-acknowledgement (HARQ-ACK) in response to the PDSCH or the PDCCH is a physical uplink control channel (PUCCH) in an uplink subframe on a primary carrier of the multiple carriers configured for the UE in a carrier aggregation scenario, wherein at least one carrier of the multiple carriers configured for the UE uses a frequency division duplex (FDD) manner and at least one carrier of the multiple carriers configured for the UE uses a time division duplex (TDD) manner, wherein an index of the uplink subframe is (n+4);
  determine HARQ-ACK feedback bits based on a quantity of the multiple carriers configured for the UE, a transmission mode of each carrier configured for the UE, and a quantity of downlink subframes corresponding to the uplink subframe; and
  detect the HARQ-ACK feedback bits on the PUCCH in the uplink subframe;
wherein:
  the downlink subframes are downlink ones in subframes that are corresponding to the uplink subframe and are on the multiple carriers either using TDD manner or using FDD manner,
  the subframes that are corresponding to the uplink subframe are subframes whose indices are n on the multiple carriers, and the subframes whose indices are n correspond to the uplink subframe having index (n+4), and
  for each carrier of the multiple carriers, either using the TDD manner or the FDD manner, and when, in the downlink subframes, the PDSCH is sent or the PDCCH indicating semi-persistent scheduling release is sent, a HARQ-ACK corresponding to the PDSCH or the PDCCH is received in the uplink subframe.

8. The apparatus according to claim 7, wherein when the UE is configured to support simultaneous transmission of a physical uplink shared channel (PUSCH) and a physical uplink control channel (PUCCH), the channel for transmitting the HARQ-ACK is a PUCCH.

9. The apparatus according to claim 7, wherein when the UE is not configured to support simultaneous transmission of a physical uplink shared channel (PUSCH) and a physical uplink control channel (PUCCH), and wherein no PUSCH is transmitted in the uplink subframe, the channel for transmitting the HARQ-ACK is a PUCCH.

10. A non-transitory computer-readable storage medium comprising instructions that, when executed by a processor, cause a network device to:
- send a physical downlink shared channel (PDSCH) or a physical downlink control channel (PDCCH) indicating semi-persistent scheduling release received in a downlink subframe on at least one carrier of multiple carriers configured for a user equipment (UE), wherein an index of the downlink subframe is n, wherein n is an integer;
- determine that a channel for transmitting a hybrid automatic repeat request-acknowledgement (HARQ-ACK) in response to the PDSCH or the PDCCH is a physical uplink control channel (PUCCH) in an uplink subframe on a primary carrier of multiple carriers configured for the UE in a carrier aggregation scenario, wherein the multiple carriers configured for the UE comprise at least one carrier using a frequency division duplex (FDD) manner and at least one carrier using a time division duplex (TDD) manner, wherein an index of the uplink subframe is (n+4);
- determine HARQ-ACK feedback bits based on a quantity of the multiple carriers configured for the UE, a transmission mode of each carrier configured for the UE, and a quantity of downlink subframes corresponding to the uplink subframe; and
- detect the HARQ-ACK feedback bits on the PUCCH in the uplink subframe;

wherein:
- the downlink subframes are downlink ones in second subframes that are corresponding to the uplink subframe and are on the multiple carriers either using TDD manner or using FDD manner,
- the subframes that are corresponding to the uplink subframe are subframes whose indices are n on the multiple carriers, and the subframes whose indices are n correspond to the uplink subframe having index (n+4), and
- for each carrier of the multiple carriers, either using the TDD manner or the FDD manner, and when, in the downlink subframes, the PDSCH is detected or the PDCCH indicating semi-persistent scheduling release is detected, a HARQ-ACK corresponding to the PDSCH or the PDCCH is fed back in the uplink subframe.

11. The non-transitory computer-readable storage medium according to claim 10, wherein when simultaneous transmission of a physical uplink shared channel (PUSCH) and a physical uplink control channel (PUCCH) is supported, the channel for transmitting the HARQ-ACK is a PUCCH.

12. The non-transitory computer-readable storage medium according to claim 10, wherein when simultaneous transmission of a physical uplink shared channel (PUSCH) and a physical uplink control channel (PUCCH) is not supported, and no PUSCH is transmitted in the uplink subframe, the channel for transmitting the HARQ-ACK is a PUCCH.

* * * * *